US011715859B2

(12) United States Patent
Koetting et al.

(10) Patent No.: US 11,715,859 B2
(45) Date of Patent: Aug. 1, 2023

(54) BATTERY INTERCONNECTS INCLUDING PREBENT ELECTRICAL TABS AND SELF-FIXTURING

(71) Applicants: William Koetting, Rochester, MI (US); Michael Joseph Nielson, Royal Oak, MI (US)

(72) Inventors: William Koetting, Rochester, MI (US); Michael Joseph Nielson, Royal Oak, MI (US)

( * ) Notice: Subject to any disclaimer, the term of this patent is extended or adjusted under 35 U.S.C. 154(b) by 161 days.

(21) Appl. No.: 17/190,388

(22) Filed: Mar. 2, 2021

(65) Prior Publication Data

US 2021/0296741 A1 Sep. 23, 2021

Related U.S. Application Data

(60) Provisional application No. 62/990,747, filed on Mar. 17, 2020.

(51) Int. Cl.
*H01M 50/291* (2021.01)
*H01M 50/244* (2021.01)
*H01M 50/528* (2021.01)
*H01M 50/211* (2021.01)
*H01M 50/507* (2021.01)
(Continued)

(52) U.S. Cl.
CPC ....... *H01M 50/291* (2021.01); *H01M 50/211* (2021.01); *H01M 50/244* (2021.01); *H01M 50/507* (2021.01); *H01M 50/528* (2021.01); *H01M 50/553* (2021.01); *H01M 50/548* (2021.01); *H01M 50/55* (2021.01)

(58) Field of Classification Search
CPC ............. H01M 50/291; H01M 50/528; H01M 50/211; H01M 50/244; H01M 50/507; H01M 50/553; H01M 50/548; H01M 50/55
See application file for complete search history.

(56) References Cited

U.S. PATENT DOCUMENTS 3,163,412 A1  4/2012 Koetting et al.
9,553,343 B2 * 1/2017 Malcolm ............ H01M 50/519
(Continued)

OTHER PUBLICATIONS

Lee, Shawn S., et al.. Joining Technologies for Automotive Lithium-Ion Battery Manufacturing: A Review, Proceedings of the ASME 2010 International Manufacturing Science and Engineering Conference MSEC2010, Oct. 12-15, 2010, Erie Pennsylvania, USA, MSEC2010-34168, pp. 541-549.
(Continued)

*Primary Examiner* — Jane J Rhee
(74) *Attorney, Agent, or Firm* — Robert F. Billings, PLLC

(57) ABSTRACT

Systems, methods, and other implementations described herein relate to a battery for use in a battery cell assembly that facilitates pack manufacturing. In one embodiment, the battery cell assembly includes a first battery cell having two electrical tabs extending from the first battery cell. The battery cell assembly also includes a second battery cell positioned substantially adjacent to the first battery cell and having two electrical tabs extending from the second battery cell. Additionally, the electrical tabs of the first and second battery cells are prebent. The battery cell assembly further includes a busbar operatively connected to the electrical tabs of the first and second battery cells.

5 Claims, 16 Drawing Sheets

(51) Int. Cl.
    *H01M 50/553* (2021.01)
    *H01M 50/548* (2021.01)
    *H01M 50/55* (2021.01)

(56) References Cited

U.S. PATENT DOCUMENTS

| | | |
|---|---|---|
| 9,935,305 B2 | 4/2018 | Makino et al. |
| 10,218,027 B2 | 2/2019 | Gohl et al. |
| 2011/0229754 A1* | 9/2011 | Zhao .................... H01M 50/00 |
| | | 29/730 |
| 2015/0303436 A1 | 10/2015 | Koetting et al. |
| 2016/0164051 A1* | 6/2016 | Cho .................... H01M 50/531 |
| | | 429/179 |

OTHER PUBLICATIONS

Das, Abhishek, et al., Joining Technologies for Automotive Battery Systems Manufacturing, World Electric Vehicle Journal Jul. 5, 2018, pp. 1-13, 9, 22.

* cited by examiner

BATTERY INTERCONNECTS INCLUDING PREBENT ELECTRICAL TABS AND SELF-FIXTURING

CROSS-REFERENCE TO RELATED APPLICATIONS

This application claims priority of U.S. Provisional Patent Application 62/990,747 filed on Mar. 17, 2020, the disclosure of which is hereby incorporated by reference in its entirety.

TECHNICAL FIELD

Embodiments described herein generally relate to the field of batteries and battery modules. More specifically, the present disclosure is directed to battery cell packaging as it relates to the interconnection of electrical tabs of battery cells.

BACKGROUND

In recent years, batteries have attracted considerable attention as an energy source for electric vehicles, hybrid electric vehicles, robots, backup power supplies, and so on. As such, demand for battery packs capable of higher output power and greater capacity has grown, translating into an increase in the number of battery cells within the battery pack. In the case of stackable type battery cells (e.g., pouch-type battery cells), interconnecting numerous battery cell tabs in a series and/or parallel configuration during the battery pack manufacturing process has proven costly and time-consuming. One such processing step includes feeding battery cell tabs through slots in a battery frame and/or a busbar element before manipulating the tabs for interconnection. Thus, there is a need for a battery pack assembly that promotes the reduction of processing steps while streamlining the battery pack manufacturing process.

SUMMARY

Example systems and methods are disclosed herein that relate to battery cell assemblies and battery cell configurations to reduce the complexity of a battery pack manufacturing process. Typical multi-cell battery pack processing steps include: 1) feeding electrical tabs of battery cells through slots of a frame and/or busbar, and 2) preparing the electrical tabs for electrical connection to the busbar by bending the tabs significantly. To accomplish these two manufacturing steps, substantial time, fixturing, and process control are needed. Therefore, in one or more arrangements, the noted systems and methods offer opportunities to eliminate manufacturing processing steps related to battery cell interconnection, thus reducing battery pack manufacturing costs.

In one embodiment, a battery for use in a battery pack is disclosed. A battery cell of the battery includes at least one electrical tab extending from the battery cell. The at least one electrical tab is prebent.

In another embodiment, a battery cell assembly is disclosed. The battery cell assembly includes a first battery cell having two electrical tabs extending from the first battery cell. The battery assembly also includes a second battery cell positioned substantially adjacent to the first battery cell and including two electrical tabs extending from the second battery cell. The electrical tabs of the first and second battery cells are prebent. Additionally, a busbar operatively connects the electrical tabs of the first battery cell to the electrical tabs of the second battery cell.

In another embodiment, a method of manufacturing a battery cell assembly for a battery pack is disclosed. The battery cell assembly includes a plurality of battery cells, and each battery cell includes at least one electrical tab being prebent. The battery cell assembly includes a busbar contoured substantially complementary to the electrical tabs. The method includes operatively connecting the busbar to the at least one electrical tab without substantially deforming the at least one electrical tab, whereby subsequent bending of the at least one electrical tab is unnecessary.

In yet another embodiment, a method of manufacturing a battery cell assembly for a battery pack is disclosed. The battery cell assembly includes a first battery cell having two electrical tabs extending from the first battery cell and a second battery cell having two electrical tabs extending from the second battery cell. The electrical tabs of the first and second batteries are prebent. The battery cell assembly further includes a busbar and a support structure having a first cell frame and a second cell frame. The method includes stacking the first battery cell, the second battery cell, and the support structure such that the first cell frame is adjacent to the first battery cell, the second battery cell is adjacent to the first cell frame, the second cell frame is adjacent to the second battery cell, and the support structure is in contact with first sides of the electrical tabs. The method also includes operatively connecting the busbar to second sides of the electrical tabs, the second sides being opposite to the first sides, such that electrical tabs are disposed between the support structure and the busbar without substantially deforming the electrical tabs.

DETAILED DESCRIPTION

Figure 1:
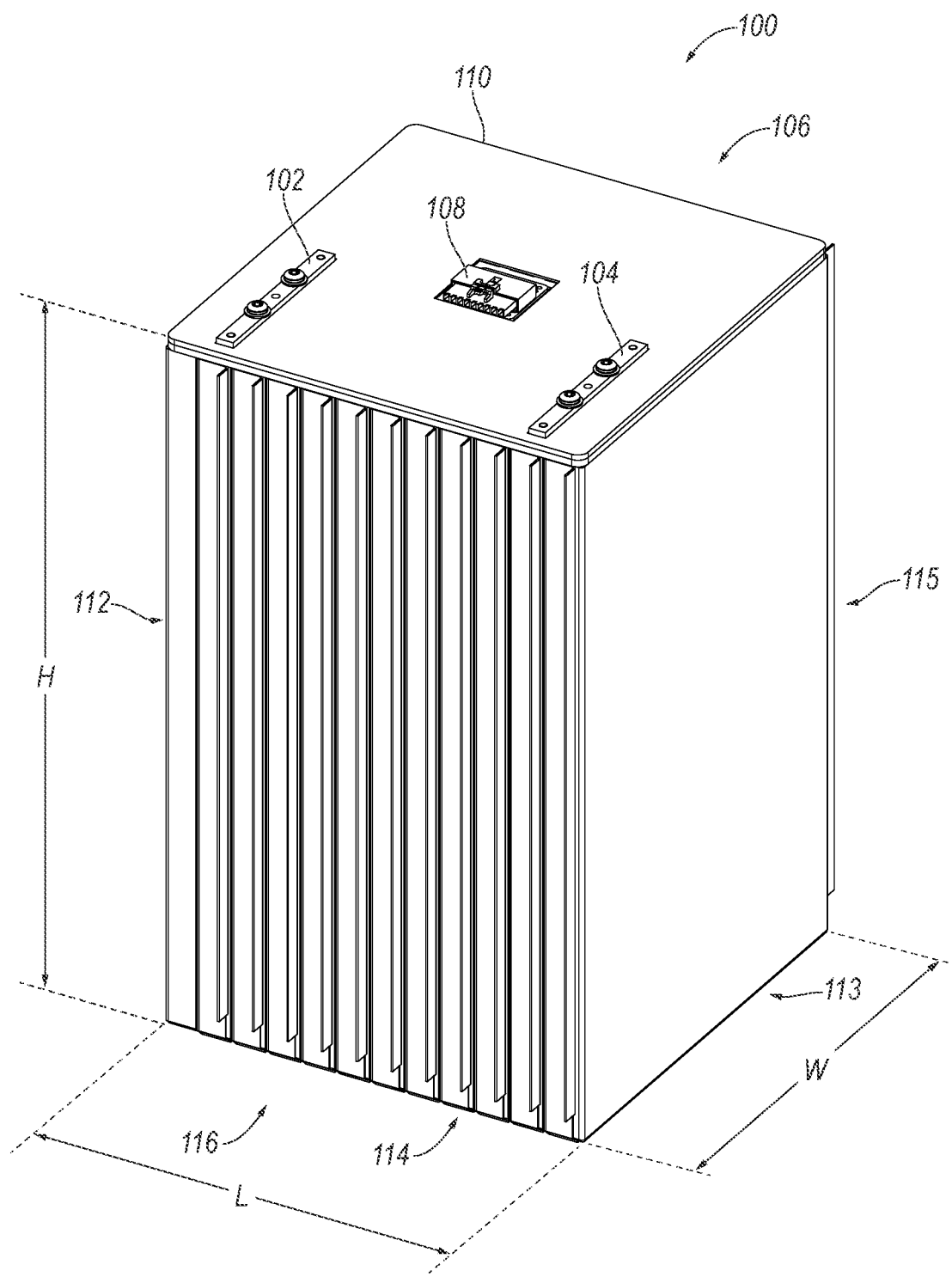
FIG. 1 is a perspective view of an example battery pack.

Systems, methods, and other embodiments associated with the assembly and manufacture of a battery cell assembly that includes a plurality of battery cells are disclosed. One of the challenges of manufacturing a battery pack is the electrical interconnection of electrical tabs of the battery cells. For example, to illustrate a few of these challenges, a busbar electrically interconnects two or more battery cells and transfers current between the battery cells. Typical electrical interconnection manufacturing techniques include inserting the electrical tabs through slots in the busbar. Further, the electrical tabs are formed onto the busbar by a bending process to prepare the battery cells for electrical connection.

Accordingly, arrangements described herein are directed to a battery cell assembly and battery cell configurations (i.e., electrical tab formations) that avoid feeding the electrical tabs through slots of the busbar and eliminate bending of the electrical tabs during a battery pack manufacturing process. In one or more embodiments, the electrical tabs of the battery cell extend from the battery cells and are prebent, e.g., via an offline or parallel process. For example, the electrical tabs may include one or more radii to simplify the interconnection of the battery cells. In other words, the battery cell may have prebent electrical tabs with one or more bends and/or semi-cylindrical portions. As set forth below, other components for interconnecting the battery cells (e.g., the busbar, support structures, etc.) are contoured to receive the electrical tabs. Consequently, in one or more arrangements, the contouring prevents the electrical tabs from significantly deforming when electrically coupled to the busbar. Therefore, having the electrical tabs prebent into a final form before assembling the battery pack, it is unnecessary to bend the electrical tabs or feed the electrical tabs through the busbar, eliminating at least two battery cell interconnect processing steps.

Furthermore, in one or more arrangements, a frame member is operatively connected to one or more busbars. The frame member is structured to carry the one or more busbars and align them with the electrical tabs during the battery pack manufacturing process. Accordingly, the frame member acts as a guide for self-fixturing the one or more busbars, causing an automatic alignment of the one or more busbars with the electrical tabs. The self-fixturing increases the efficiency of the battery cell interconnection process, thus reducing interconnect cycle time. Therefore, implementations described herein can enable greater flexibility to the battery cell interconnection process, permitting considerable cost savings during battery pack manufacturing.

Detailed embodiments are disclosed herein for securing and electrically interconnecting electrical tabs of a plurality of battery cells for a battery pack. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-18, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a battery pack 100 is illustrated. The battery pack 100 may be a lithium-ion battery pack or any other rechargeable battery pack suitable for storing electrical energy. For example, the battery pack 100 may be configured to provide electrical power to a primary drive train of an electric vehicle, an auxiliary drive train of a hybrid electric vehicle, or any other device that may benefit from the functionality discussed herein.

The battery pack 100 includes a positive terminal 102, a negative terminal 104. For example, as shown in FIG. 1, the positive and negative terminals 102, 104 are mounted to a top end 106 of the battery pack 100. The positive and negative terminals 102, 104 may interface directly to a device receiving the electrical power. Alternatively, other battery packs (not shown) may electrically connect to the positive and negative terminals 102, 104 in a series and/or parallel configuration to create a larger battery pack. The larger battery pack would be capable of a higher voltage and/or greater electrical capacity than the battery pack 100. The location of the positive and negative terminals 102, 104 on the battery pack 100 may be different than shown in FIG. 1.

The battery pack 100 may include a sensing connector 108. For example, the sensing connector 108 may be mounted to the battery pack 100 and accessible from the top end 106, as shown in FIG. 1. The battery pack 100 includes battery cells, as outlined in greater detail below in FIGS. 3-4, and the battery cells and/or other components of the battery pack 100 may couple to the sensing connector. The sensing connector 108 includes elements (not shown) for transferring information between the battery pack 100 and other devices, for instance, a battery management system (not shown). The elements may include, e.g., electrical terminals, transceivers, etc. The information may indicate a state of the battery pack 100. For example, the information may include voltages of the battery cells, temperatures of the battery cells and/or the battery pack 100, and/or a current through the battery pack 100. The elements of the sensing connector 108 may be configured to carry cell balancing currents. The cell balancing currents may distribute current amongst the battery cells to keep the voltage of the battery cells within a given tolerance of each other.

The battery pack may include a top cover 110 at the top end 106 of the battery pack 100, for example, as shown in FIG. 1. The top cover 110 may be configured to receive the positive and negative terminals 102, 104, the sensing connector 108, and/or other components that interface with the battery pack 100. For example, the top cover 110 may include openings to enable access to the positive and negative terminals 102, 104, and the sensing connector 108.

Furthermore, the battery pack 100 includes a termination end 112, a termination end 113, a non-termination end 114, a non-termination end 115, and a bottom end 116. With the top end 106, the termination ends 112, 113, the non-termination ends 114, 115, and the bottom end 116 form a volume that defines outer dimensions of the battery pack 100. As will become more apparent with further illustrations, a length L between the termination ends 112, 113 defines the length of the outer dimensions and is dependent on the number of the battery cells. A width W between the non-termination ends 114, 115 defines the width of the outer dimensions and is dependent on a width of the battery cells. A height H between the top end 106 and the bottom end 116 defines the height of the outer dimensions and is dependent on a height of the battery cells.

Figure 2:
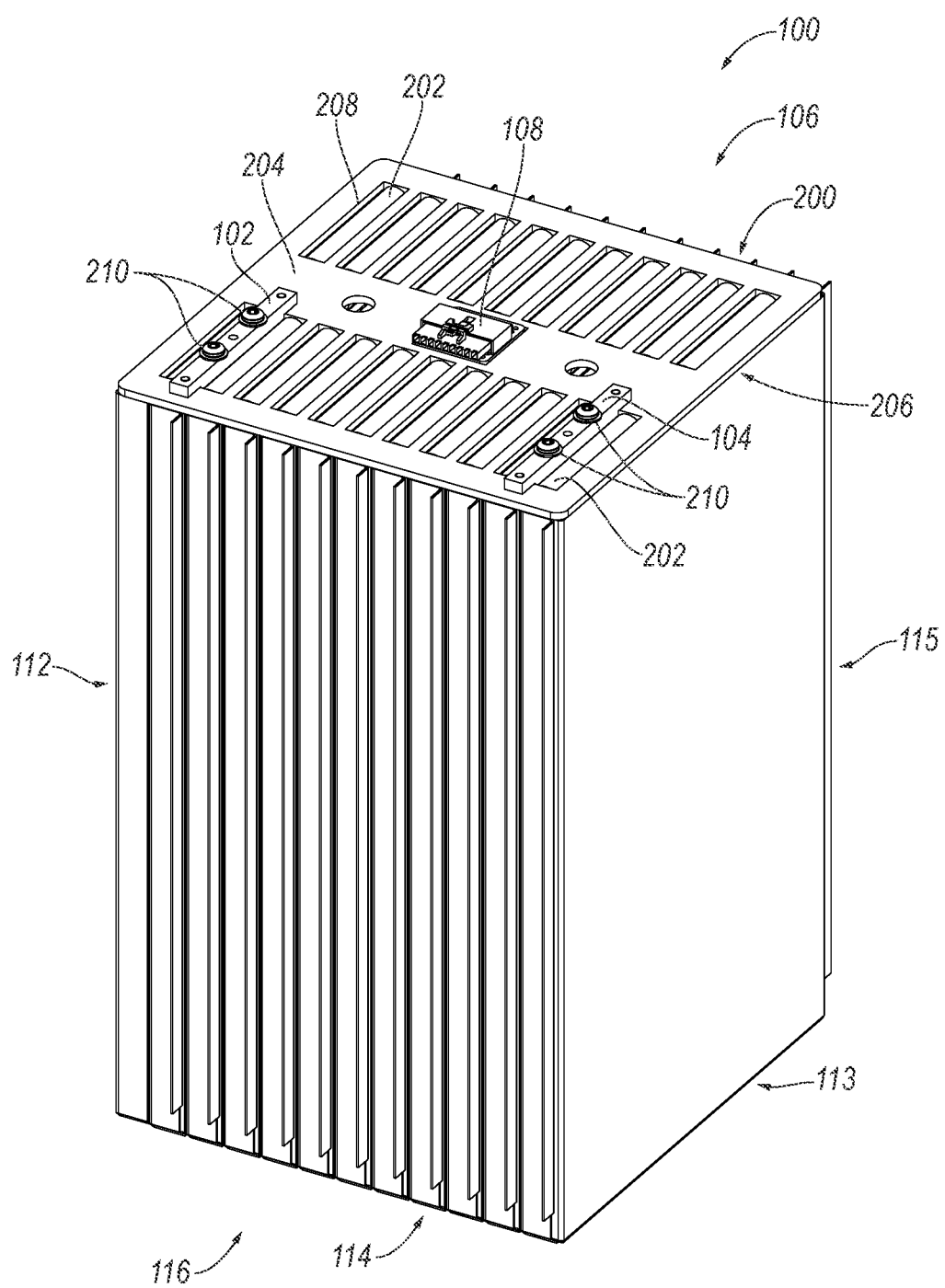
FIG. 2 is a perspective view of the battery pack with a top cover removed.

Removing the top cover 110, as illustrated in FIG. 2, reveals a frame member 200 and a busbar 202 of the battery pack 100. In one arrangement, the frame member 200 is coupled to the termination ends 112, 113, and the non-termination ends 114, 115 at the top end 106 of the battery pack 100. The frame member 200 may provide structural support to the battery pack 100.

The frame member 200 may be formed of any suitable material. For example, the frame member 200 may be a polymer (e.g., nylon, plastic, polypropylene (PP), vinyl, acrylonitrile butadiene styrene (ABS)), sheet molding compound (SMC) composites, etc.

The frame member 200 includes a top surface 204, a bottom surface 206, and a plurality of openings 208. For example, the frame member 200 has twenty-two openings 208, as shown in FIG. 2. The openings 208 extend through the frame member from the top surface 204 to the bottom surface 206. In one or more embodiments, the frame member 200 is operatively connected to the busbar 202 such that the busbar 202 is carried by the frame member 200. For example, the busbar 202 is connected to the bottom surface 206 and is configured to protrude into the openings 208. In another example, the busbar 202 protrudes through the openings 208 past the top surface 204. As set forth below, the frame member 200 aligns the busbar 202 with the battery cells allowing efficient electrical connection to the battery cells.

The positive and negative terminals 102, 104 are electrically connected to the busbar 202 using fasteners 210, e.g., screws, bolts, rivets, etc. The positive and negative terminals 102, 104 and the fasteners 210 are formed of any suitable electrically conductive material such as copper, steel, aluminum, etc.

The frame member 200 may include wire routing channels (not shown) that route electrically conductive wires from the busbar 202 to the elements of the sensing connector 108. Additionally, or in the alternative, the frame member 200 may include circuit boards with conductive traces (not shown) that electrically connect the busbar 202, one or more thermocouples of the battery pack, and/or one or more current sensors of the battery pack to the elements of the sensing connector 108. The circuit boards may include vias between the top surface 204 and the bottom surface 206 to route the conductive traces from the elements to the busbar 202, the one or more thermocouples, and/or the one or more current sensors.

Figure 3:
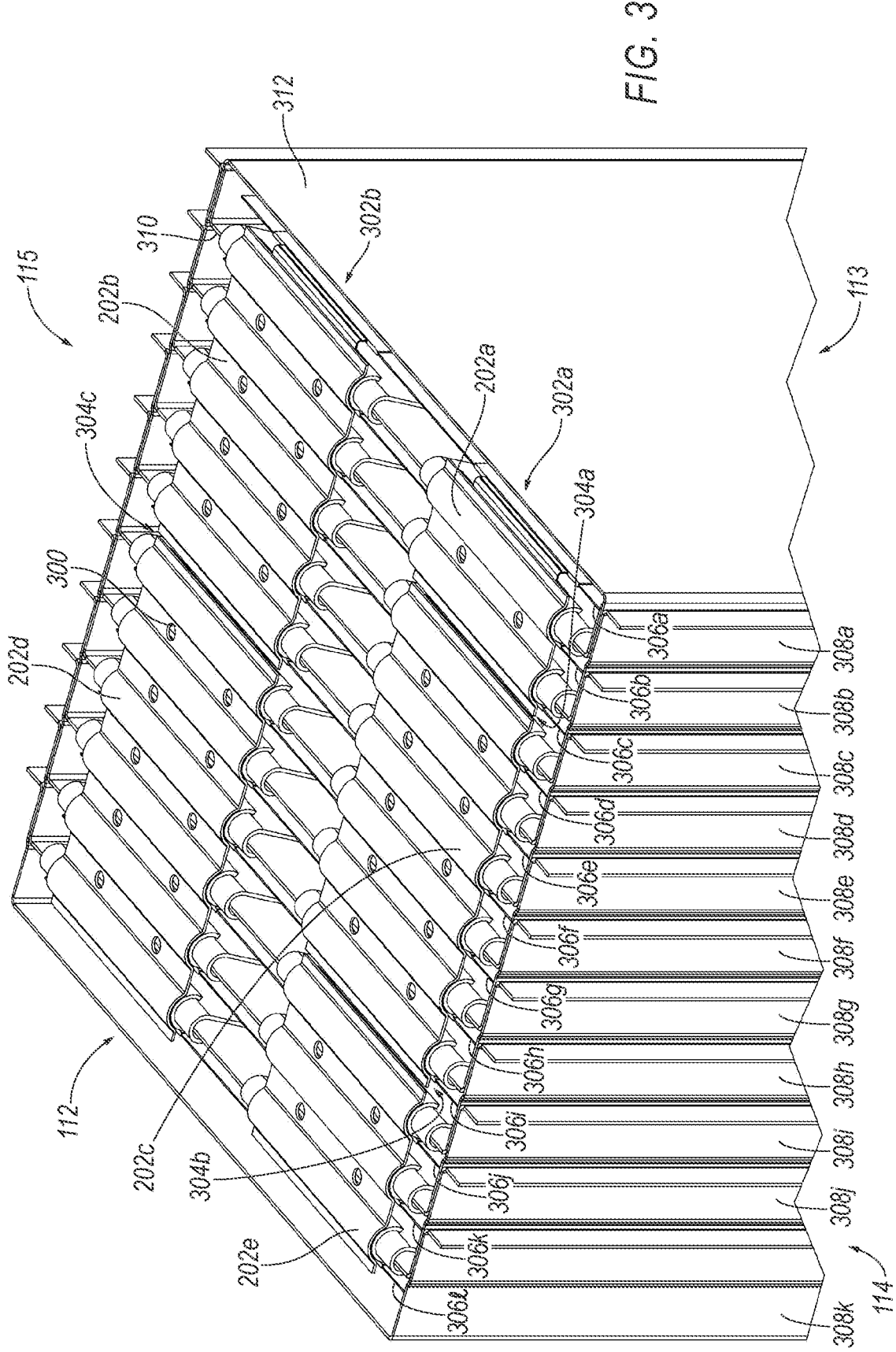
FIG. 3 is a perspective view of the battery pack with a frame member removed.

FIG. 3 illustrates the battery pack 100 with the frame member removed. As set forth above, the frame member 200 carries the busbar 202, but the frame member 200 is removed for demonstration purposes. FIG. 3 demonstrates the placement of the busbar 202 relative to other components of the battery pack 100. The battery pack 100 may include more than one busbar 202. For example, the battery pack 100 includes five busbars 202, e.g., 202a-202e, as shown in FIG. 3. In other words, the busbar 202 may include subcomponents that make up the busbar 202.

The busbar 202 includes a plurality of mounting features 300 (e.g., holes, grooves, etc.) for connecting the busbar 202 to the bottom surface 206 of the frame member 200, as explained in greater detail below.

In one embodiment, the busbar 202 is arranged along one or more rows 302. For example, the battery pack 100 includes two rows 302, e.g., 302a and 302b, spaced from each other between the non-termination ends 114, 115. Further, the busbars 202a, 202c, and 202e are arranged along row 302a, and the busbars 202b and 202d are arranged along row 302b, as illustrated in FIG. 3.

The busbar 202 is formed of any suitable electrically conductive material. For example, the busbar 202 may be metal such as copper, aluminum, metal alloys, plated metals, bi-metallic members (e.g., formed from cladding), and/or a plated bi-metallic member. The busbar 202, for example, busbars 202a-202e shown in FIG. 3, may be formed from different conductive materials.

The busbar 202 (e.g., the busbars 202a-202e) may be electrically and physically separated from each other by voids 304 of the battery pack 100. For example, the battery pack 100 includes three voids 304, e.g., 304a-304c, as shown in FIG. 3. Furthermore, in row 302a, busbars 202a and 202c are separated by void 304a, busbars 202c and 202e are separated by void 304b, and busbars 202b and 202d are separated by void 304c in row 302b. In one arrangement, the voids 304 are formed by partitions attached to the bottom surface 206 of the frame member 200, as set forth below in FIG. 13.

The battery pack 100 includes one or more battery cells 306, one or more cell frames 308, an abbreviated cell frame 310, and a terminating cell frame 312. For example, the battery pack 100 includes twelve battery cells 306, e.g., 306a-306l, eleven cell frames 308, e.g., 308a-308k, the abbreviated cell frame 310, and the terminating cell frame 312, as shown in FIG. 3. The cell frames 308, the abbreviated cell frame 310, and the terminating cell frame 312 are configured to couple (i.e., nest together) to hold and apply a predetermined pressure to the battery cells 306 therebetween. Any of the embodiments disclosed herein may include assemblies and methods for coupling, i.e., nesting, the cell frames 308, the abbreviated cell frame 310, and the terminating cell frame 312 to hold the battery cells 306 as disclosed in U.S. patent application Ser. No. 16/204,684, filed Nov. 29, 2018, now U.S. Patent Application Publication Number 2019/0165345, and entitled "Battery Module Including Nodal Cell Compression And Heat Rejection," which is hereby incorporated by reference in its entirety.

Figure 4:
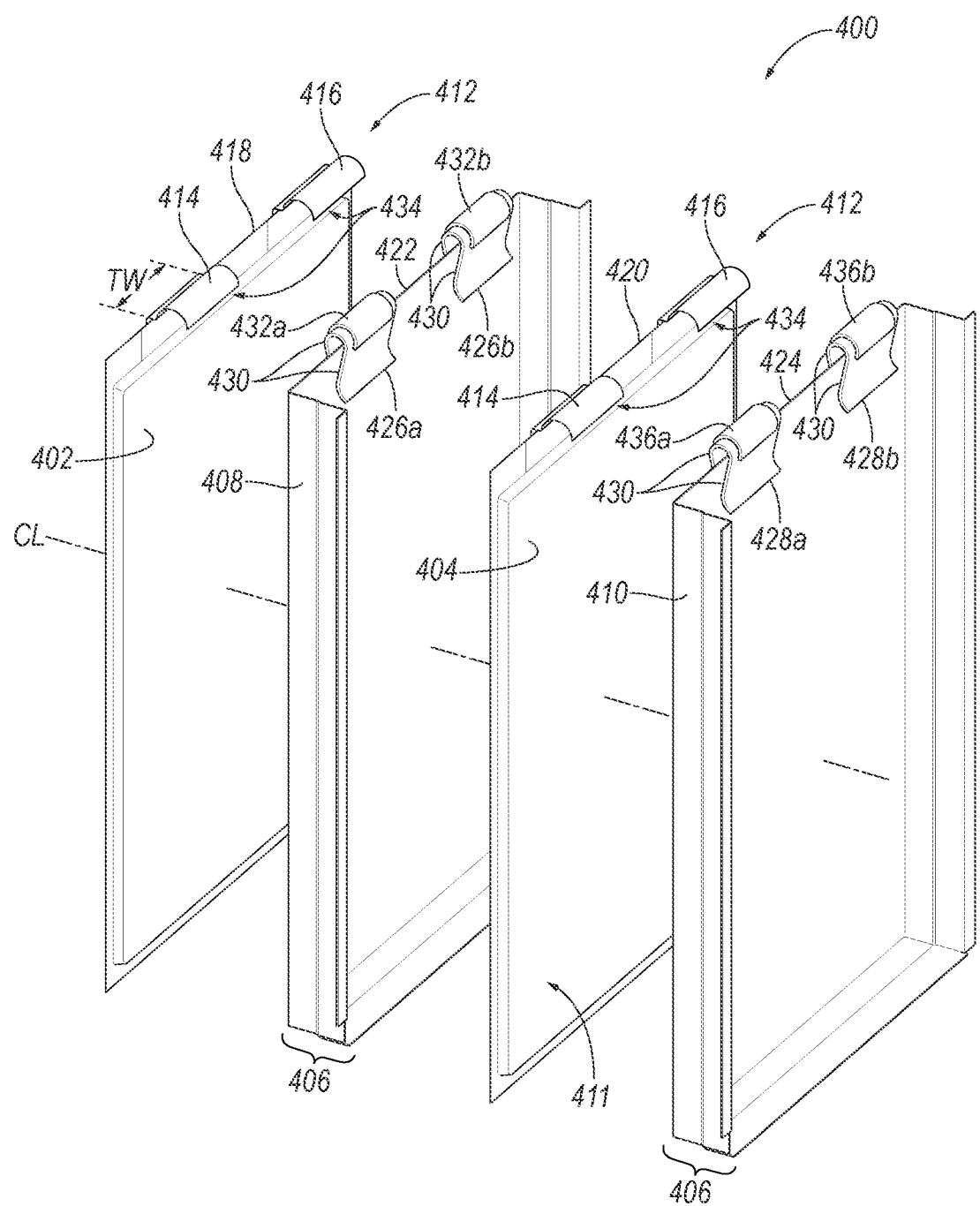
FIG. 4 is an exploded view of a battery cell assembly.

FIG. 4 illustrates an exploded view of a battery cell assembly 400 of the battery pack 100. The battery pack 100 may include one or more battery cell assemblies 400. The battery cell assembly 400 includes a first battery cell 402, a second battery cell 404, and a support structure 406 having a first cell frame 408 and a second cell frame 410. In one embodiment, the battery cell assembly 400 includes a set of battery cells (i.e., the first and second battery cells 402, 404) and a set of cell frames (i.e., the first and second cell frames 408, 410) such that the second battery cell 404 is positioned substantially adjacent to the first battery cell 402. Moreover, in one embodiment, the first cell frame 408 is disposed between the first and second battery cells 402, 404, and the second cell frame 410 is disposed along a side 411 of the second battery cell 404 facing away from the first battery cell 402. For example, the battery cell assembly 400 may include battery cells 306l, 306k, and cell frames 308j, 308i, or battery cells 306g, 306f, and cell frames 308e, 308d, etc., of the battery pack 100, as shown in FIG. 3.

For the set of battery cells to be "positioned substantially adjacent," the battery cells are stacked next to each other along a common line (e.g., a line CL, as shown in FIG. 4) with an intervening cell frame stacked along the common line and in contact with the set of battery cells. For example, the first and second battery cells 402, 404 are positioned substantially adjacent to each other because they are stacked together and in contact with the intervening first cell frame 408 along the line CL when assembled within the battery pack 100.

The first and second battery cells 402, 404 may be, for example, a lithium-ion pouch-type battery cell, prismatic-type battery cell, etc. Other types of rechargeable battery cells known to those skilled in the art that are suitable for storing electrical energy may be utilized. As set forth above, the width of the battery cells 402, 404 is defined between the non-termination ends 114, 115. Additionally, the length of the battery cells 402, 404 is defined between the top end 106 and the bottom end 116.

Continuing with FIG. 4, in one embodiment, each of the first and second battery cells 402, 404 of the battery cell assembly 400 includes at least one electrical tab 412 extending from each of the first and second battery cells 402, 404. In one arrangement, as shown in FIG. 4, the at least one electrical tab 412 includes a positive tab 414 and a negative tab 416 spaced from the positive tab 414, and the positive and negative tabs 414, 416 extend outward from a first end 418 of the first battery cells 402 and a first end 420 of the second battery cell 404, respectively. Furthermore, in another arrangement, the positive and negative tabs 414, 416 extend in a same direction. The electrical tabs 412 (e.g., the positive and negative tabs 414, 416) may be thin, flat, rectangular tabs, physically distinct, and separated a distance from one another. The electrical tabs 412 may have an electric potential across, for example, the positive and negative tabs 414, 416, and carry an electrical current into and out of the first and second battery cells 402, 404. Depending on the orientation of the battery cells 306, the positive and negative tabs 414, 416 may be interchanged from what is illustrated in FIG. 4.

In one arrangement, the first cell frame 408 of the support structure 406 includes a first end 422, and the second cell frame 410 of the support structure 406 includes a second end 424. Additionally, the first cell frame 408 further includes a clip 426 operatively connected to the first end 422, and the second cell frame 410 further includes a clip 428 operatively connected to the second end 424. For example, the first cell frame 408 includes two clips 426 spaced apart from each other, e.g., 426a and 426b, and a second cell frame 410 includes two clips 428 spaced apart from each other, e.g., 428a and 428b.

In one embodiment, the first cell frame 408 further includes a tab backer 432. Referring to FIG. 4, the first cell frame 408 includes two tab backers 432, e.g., 432a and 432b, spaced apart from each other and disposed on the clips 426a, 426b, respectively, of the first cell frame 408. When assembled (e.g., within the battery pack 100), the tab backer 432a is between the clip 426a and a first side 434 of the electrical tab 412, e.g., the positive tab 414. Furthermore, the tab backer 434b is between the clip 426b and the first side 434 of the electrical tab 412, e.g., the negative tab 416.

Additionally, in one embodiment, the second cell frame 410 further includes a tab backer 436. Referring to FIG. 4, the second cell frame 410 includes two tab backers 436, e.g., 436a and 436b, spaced apart from each other and disposed on the clips 428a, 428b, respectively, of the second cell frame 410. When assembled, as set forth below, the tab backer 436a is between the clip 428a and the first side 434 of the electrical tab 412, e.g., the positive tab 414. Furthermore, the tab backer 436b is between the clip 428b and the first side 434 of the electrical tab 412, e.g., the negative tab 416.

The tab backers 432, 436 are formed of any suitable electrically conductive material. For example, the tab backer 432, 436 may be metal such as copper, aluminum, metal alloys, plated metals, bi-metallic members (e.g., formed from cladding), and/or a plated bi-metallic member. The tab backers 432, 436 may be formed from different conductive materials.

Figure 6:
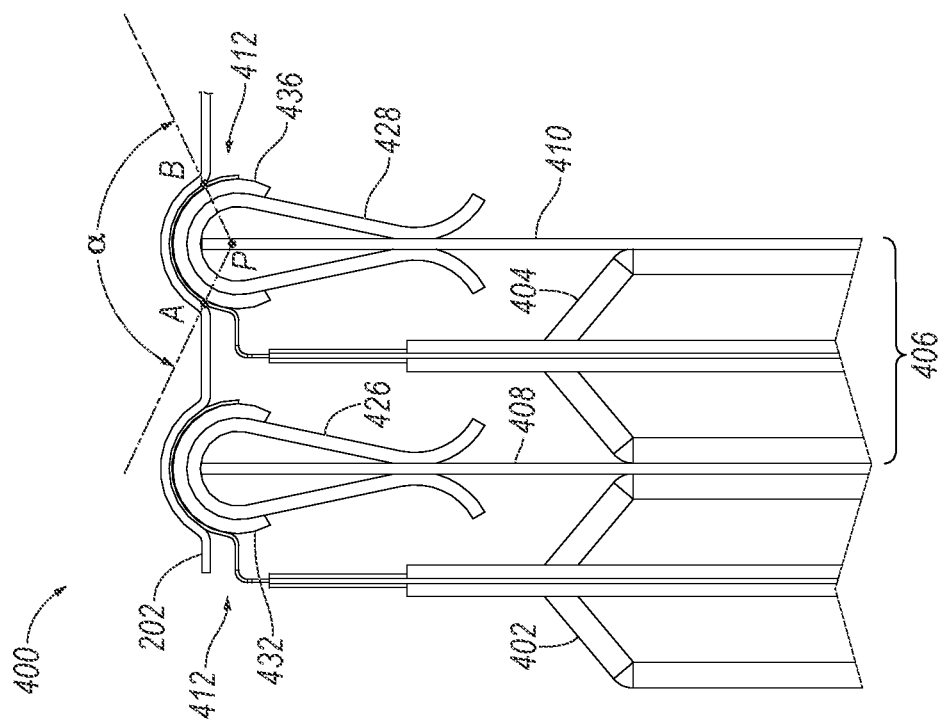
FIG. 6 is a side view of the battery cell assembly of FIG. 5.
Figure 5:
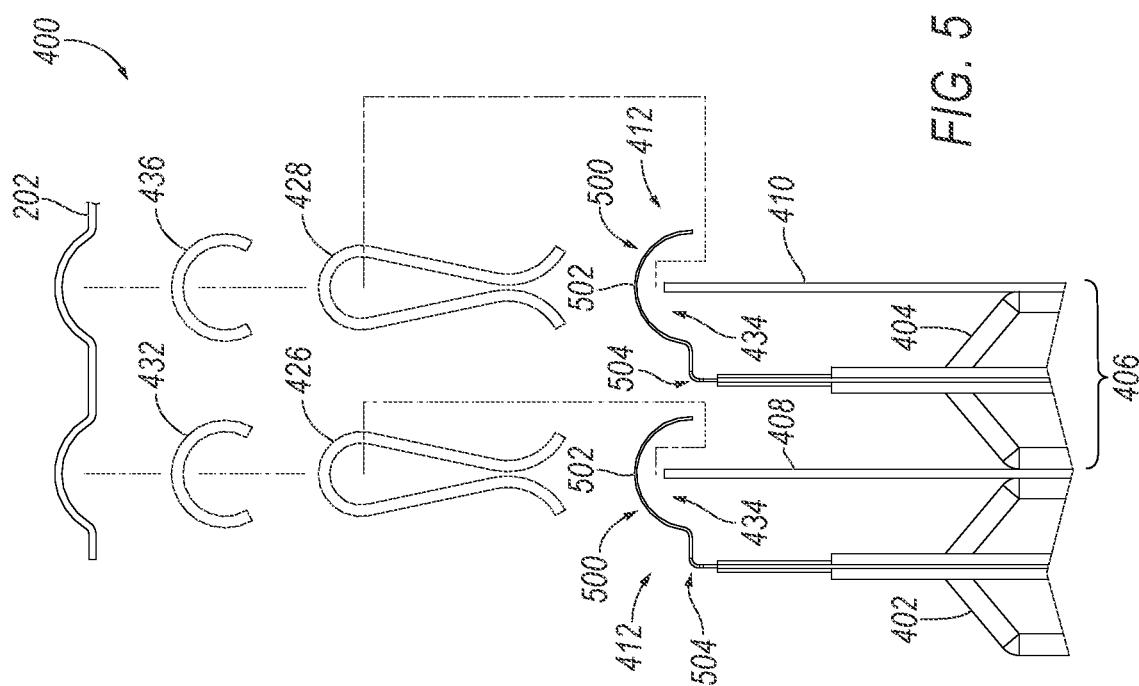
FIG. 5 is a side view of a battery assembly with a busbar, tab backers, and clips in an exploded view.

With reference to FIGS. 5-6, the battery cell assembly 400 further includes the busbar 202. FIG. 5 illustrates an exploded side view of the battery cell assembly 400 with the clips 426, 428, the tab backers 432, 436, and the busbar 202 separated from the first and second cell frames 408, 410 and the electrical tabs 412. FIG. 6 shows a side view of the battery cell assembly 400 of FIG. 5. The busbar 202 is operatively connected to the electrical tabs 412 of the first and second battery cells 402, 404, as set forth below.

As set forth above, the support structure 406 of the battery cell assembly 400 includes the first and second cell frames 408, 410. The support structure 406 also includes components associated with the first and second cells frames 408, 410, namely the clips 426, 428 and the tab backers 432, 436. In one arrangement, the support structure 406 is positioned on each of the first sides 434 of the electrical tabs 412 of the first and second battery cells 402, 404 such that the electrical tabs 412 of the first and second battery cells 402, 404 are disposed between the support structure 406 and the busbar 202. In another arrangement, each of the electrical tabs 412 of the first and second battery cells 402, 404 includes a second side 500 opposite the first side 434, and the support structure 406 contacts each of the first sides 434 of the electrical tabs 412 while the busbar 202 contacts each of the second sides 500 of the electrical tabs 412, as shown in FIGS. 5 and 6.

The support structure 406 provides a structural foundation for holding the electrical tabs 412 and the busbar 202, for example, when the busbar 202 and the electrical tabs 412 of the first and second battery cells 402, 404 are permanently joined or bonded, i.e., fixedly coupled together, to form an electrical connection. Moreover, in one or more arrangements, the busbar 202 is electrically connected to the electrical tabs 412 of the first and second battery cells 402, 404 and is configured to carry all or a portion of a battery current between the first and second battery cells 402, 404.

In one arrangement, the busbar 202 and the electrical tabs 412 of the first and second battery cells 402, 404 are welded together. For example, the busbar 202 and the electrical tabs 412 of the first and second battery cells 402, 404 are permanently joined or bonded together by techniques, such as laser welding, electric resistance welding (ERW), gas metal arc welding (GMAW), ultrasonic metal welding, etc.

The clips 426, 428 are configured to apply a retention force against the first and second cell frames 408, 410 when attached to the first and second ends 422, 424, respectfully. The retention force is substantial enough to hold the clips to the first and second cell frames 408, 410 while exposed to typical velocities and accelerations applied during a battery pack manufacturing process. For example, the clips are configured to apply the retention force, which tends to move legs 430 (FIG. 4) of the clips toward each other. The retention force generated by the clip increases as the legs 430 move away from each other. The retention force, i.e., the force applied by the clips on the first or second cell frames 408, 410, may, for example, be 1N, 2N, 10N, 100N, etc.

The first and second cell frames 408, 410, the abbreviated cell frame 310, and a terminating cell frame 312 may be formed of any suitable thermally conductive metallic material such as aluminum, copper, steel, or other thermally conductive materials known to those skilled in the art. The first and second cell frames 408, 410, the abbreviated cell frame 310, and a terminating cell frame 312 may each be formed of different materials.

The clips 426, 428 are formed of any suitable electrically insulating material, e.g., nylon, polypropylene, polyvinyl chloride (PVC), rubber, thermoplastic, etc. In one embodiment, the clips 426, 428 electrically isolate the tab backers 432, 436 from the first and second cell frames 408, 410. In one arrangement, the clip 426 and/or the clip 428 are each one piece units that extend along the first and second ends 422, 424, respectively. As set forth below, alternative battery cell assemblies may include more than one abbreviated cell frame. In this case, the clips 426, 428 may electrically isolate the tab backers 432, 436 from the more than one abbreviated cell frame.

Referring to FIGS. 4-6, the at least one electrical tab 412 of the battery cell assembly 400 is prebent. For example, each of the first and second battery cells 402, 404 include two electrical tabs that are prebent, as shown in FIG. 4. The term "prebent" refers to bending the at least one electrical tab 412 via an offline and/or parallel manufacturing process that forms the at least one electrical tab 412, for example, into a complex shape that includes one or more bends as illustrated in FIGS. 4-6. For example, the complex shape is traced along each of the electrical tabs 412 as the electrical tabs 412 extend outward from the first and second battery cells, and is consistent along a tab width TW of the electrical tabs 412, as shown in FIGS. 4-6.

A typical battery pack manufacturing technique for electrical interconnection of battery cells includes inserting electrical tabs through slots in a busbar. After that, the electrical tabs are formed onto the busbar by a bending process to prepare battery cells for electrical interconnection. Having the electrical tabs 412 prebent in an offline or parallel process would eliminate the bending process of forming the electrical tabs 412 onto the busbar 202 during battery pack manufacturing. Moreover, the structure of the battery cell assembly 400 avoids manufacturing steps of feeding the electrical tabs 412 through slots. It should be appreciated that feeding tabs through slots may require a precise and narrow process window to avoid damaging the tabs during battery pack manufacturing.

Alternatively, the electrical tabs 412 may be bent during the battery pack manufacturing of the battery pack 100. In this case, feeding the electrical tabs 412 through slots during battery pack manufacturing would be avoided due to the structure of the battery cell assembly 400.

Referring to FIG. 5, the at least one electrical tab 412, in one embodiment, includes a semi-cylindrical portion 502. For example, each of the electrical tabs 412 of the first and second battery cell 402, 404 include the semi-cylindrical portion 502, as shown in FIG. 5. The semi-cylindrical portion 502 of an associated cylinder includes a radius of the cylinder that may span angles greater than, less than, or equal to 180 degrees about an axis of the cylinder.

Again referring to FIG. 5, the at least one electrical tab 412, in one arrangement, includes at least one substantially ninety-degree bend 504. For example, each of the electrical tabs 412 of the first and second battery cell 402, 404 includes one substantially ninety-degree bend 504, as shown in FIG. 5. The substantially ninety-degree bend 504 may be, e.g., 89 degrees, 88 degrees, 87 degrees, 91 degrees, 92 degrees, 93 degrees, etc.

Referring to FIG. 6, the electrical tabs 412 are sandwiched between the busbar 202 and the tab backers 432, 436 of the support structure 406. In one or more embodiments, the busbar 202 is contoured substantially complementary to the electrical tabs 412. In fact, the busbar 202, the tab backers 432, 436, and the clips 426, 428 are contoured substantially complementary to the electrical tabs 412. The term "contoured substantially complementary" refers to curvatures of the busbar 202, the tab backers 432, 436, and the clips 426, 428 that match a curvature of the electrical tabs 412 such that when sandwiched together (i.e., stacked on top of each other), air gaps between the busbar 202, the electrical tabs 412, and the tab backers 432, 436 within an angular span a are minimized. Referring to FIG. 6, the angular span a is defined as a rotation about a center point P between a point A and a point B, where the points A and B are the outermost points of contact between the busbar 202 and the electrical tabs 412 for a given electrical tab 412. A connection area is defined between the busbar 202 and the electrical tabs 412 when sandwiched together (i.e., with the tab backers 432, 436) within the angular span a, and may be used for welding the busbar 202 to the electrical tabs along the tab width TW of the electrical tabs 412.

Alternatively, the electrical tabs 412 may include other shapes besides and/or in addition to the semi-cylindrical portion 502 and the at least one substantially ninety-degree bend 504. In this case, the busbar 202 continues to be contoured substantially complementary to the electrical tabs 412. In fact, the busbar 202, the tab backers 432, 436, and the clips 426, 428 continue to be contoured substantially complementary to the electrical tabs 412.

FIG. 6 further depicts the electrical tabs 412 as thinner than the busbar 202 or the tab backers 432, 436. However, it should be appreciated that in other embodiments, the electrical tabs 412 may be the same thickness or a greater thickness than the busbar 202 and/or the tab backers 423, 436. When the electrical tabs 412 are thinner than the tab backers 432, 436, as shown in FIGS. 5-6, welding the electrical tabs 412 to the tab backers 432, 436 using the busbar 202 may be advantageous. For example, the busbar 202 may mitigate damage to the electrical tabs 412 from excessive heat during welding.

The busbar 202, the electrical tabs 412, and the tab backers 432, 436 (i.e., sandwiched components) may be welded starting at the busbar 202, and a resulting weld may penetrate through the electrical tabs 412 a distance into the tab backers 432, 436. Absorbing heat generated during the welding process is one of the functions of the tab backers 432, 436. Welding the busbar 202 to the electrical terminals 412 with the inclusion of the tab backers 423, 436 may mitigate damage to the electrical terminals 412. Suppose the electrical tabs 412 are made from thin materials. In that case, direct welding of the electrical tabs to the tab backers 432, 436 without the busbar 202 necessitates a more precise and narrow process window to avoid excessive heat that can distort the components or actually cut through the electrical tabs 412. Likewise, direct welding of the electrical tabs 412 to the busbar 202 without the tab backers 432, 436 requires a more precise and narrow process window to avoid excessive heat that can distort the components or actually cut through the electrical tabs 412.

The tab backers 432, 436 may "snap" onto the clips 426, 428. In other words, the tab backers 432, 436 may be configured to apply a retaining force directed towards the clips 426, 428 that holds the tab backers 432, 436 onto the clips 426, 428. The clips 426, 428 and/or tab backers 432, 436 may be configured to elastically deform such that the tab backers 432, 436 are held onto the clips 426, 428. The clips 426, 428 and the tab backers 432, 436 may be "snapped" together during an offline process to form a subassembly.

As set forth above, the busbar 202 is carried by the frame member 200. When the frame member 200 (and thus the busbar 202) are brought into contact with the electrical tabs 412, as set forth below, the electrical tabs 412 are sandwiched between the busbar 202 and the tab backers 432, 436. The busbar 202, the tab backers 432, 436, and/or the clips 426, 428 may be configured to elastically deform. Furthermore, the busbar 202, the tab backers 432, 436, and the clips 426, 428 may have a different compliance from one another.

In addition to the busbar 202, the tab backers 432, 436, and the clips 426, 428 being contoured substantially complementary to the electrical tabs 412, their elastic deformation may contribute to minimizing the air gaps between the electrical tabs 412, the busbar 202, and the tab backers 432, 436 within the angular span a. Additionally, or in the alternative, the contours of the busbar 202, the tab backers 432, 436, the clips 426, 428, and/or the electrical tabs 412 may be different from one another to contribute to minimizing the air gaps between the electrical tabs 412, the busbar 202, and the tab backers 432, 436. For example, a radius of the curvature of each of the contours of the busbar 202, the tab backers 432, 436, the clips 426, 428, and/or the electrical tabs 412 may be different from one another.

Sandwiching the electrical tabs 412 between the busbar 202 and the tab backers 432, 436 reduces the sensitivity of the welding process to air gaps between the electrical tabs 412, the busbar 202, and the tab backers 432, 436. It also enables improved welding of dissimilar material. With the connection area being contoured, the surface area for welding the busbar 202 to the electrical tabs may be greater than if the connection area were to follow a straight, non-contoured line. The busbar 202 may also provide secondary conductive paths to carry current, which can reduce the overall battery pack electrical resistance as seen across the positive and negative terminals 102, 104. In other words, the busbar 202 does not include slots, which may tend to decrease the electrical resistance of a given busbar as compared to a busbar that has slots. Using a three-layer sandwich arrangement of the busbar 202, the electrical terminals 412, and the tab backers 432, 436 may enhance mechanical robustness compared to the direct welding of the busbar 202 to the electrical tabs 412.

The battery pack 100 may increase its current carrying capability by adding additional busbars (not shown). The additional busbars may be permanently joined or bonded, i.e., fixedly coupled together, to the busbar 202. For example, the additional busbars may be welded to a top surface of the busbar 202, i.e., stacked on top of the busbar 202.

Figure 7:
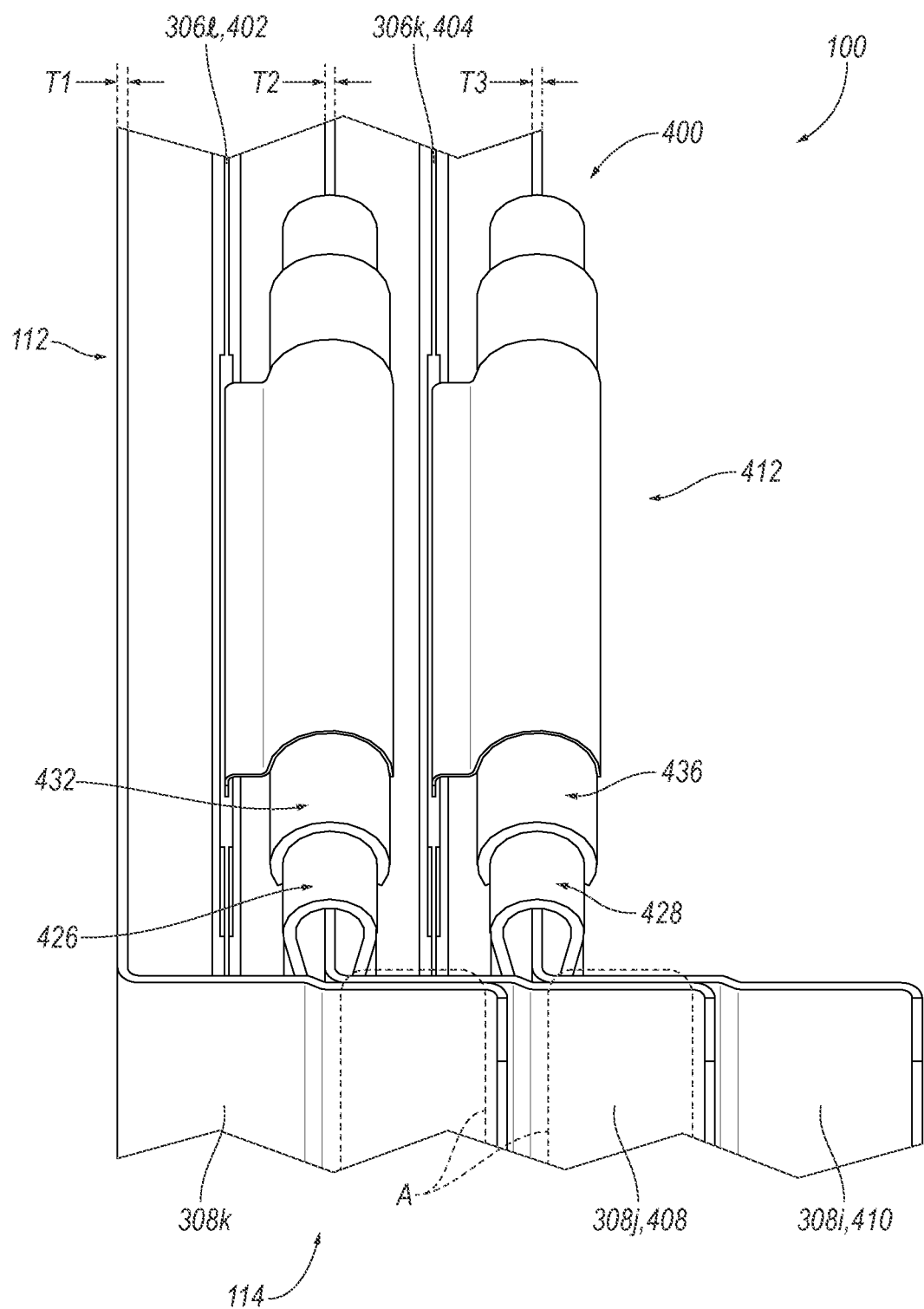
FIG. 7 is a zoomed-in perspective view of a battery cell assembly positioned in the battery pack at a termination end.

FIG. 7 illustrates a zoomed-in perspective view of the battery cell assembly 400 positioned in the battery pack 100 at the termination end 112 without the busbar 202. The first and second cell frames 408, 410 are nested together to hold the first and second battery cells 402, 404 therebetween. As described in the above-mentioned incorporated reference, i.e., U.S. patent application Ser. No. 16/204,684, the first and second cell frames 408, 410 apply a predetermined pressure on the first and second battery cells 402, 404 during the battery pack manufacturing process. For example, FIG. 8 demonstrates an exploded view of the battery cell assembly 400 of FIG. 7, and the predetermined pressure is applied along faces 800 of the first battery cell 402 and faces 802 of the second battery cell 404. Once the predetermined pressure along the faces 800, 802 is achieved, the first and second cell frames 408, 410 may be permanently joined or bonded, i.e., fixedly coupled together, to maintain the predetermined pressure. For example, the first and second cell frames 408, 410 may be welded together along the non-termination ends 114, 115 of the battery pack 100 in overlap zones A where the first and second cell frames 408, 410, the cell frames 308$j$, 308$k$, etc. overlap, as shown in FIG. 7. Furthermore, the battery pack 100 may include compliant structures between the cell frames 308 and the battery cells 306, as demonstrated in the above-mentioned incorporated reference, that allows for battery cell growth while maintaining a uniform cell pressure along the faces 800, 802.

Figure 8:
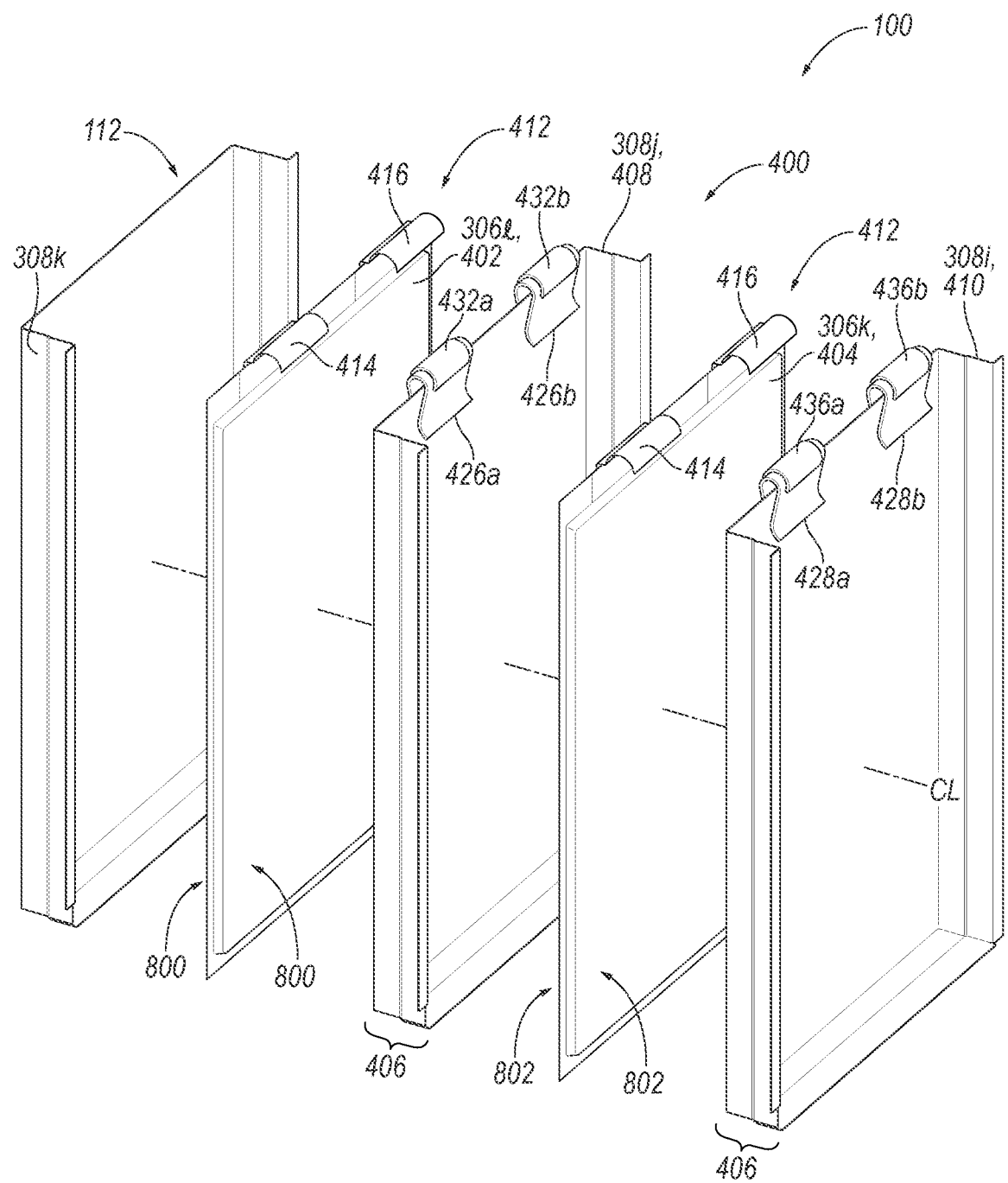
FIG. 8 is an exploded view of the battery cell assembly of FIG. 7.

With reference to FIGS. 3, and 7-8, the battery cell assembly 400 and the cell frame 308$k$ of the battery pack 100 are shown. The cell frame 308$k$ is closest to the termination end 112 and does not include the clips 426, 428 or the tab backers 432, 436. A thickness T1 of the cell frame 308$k$, as shown in FIG. 7, in one arrangement, may be greater as compared to thicknesses of other cell frames, for example, a thickness T2 of the first cell frame 408, a thickness T3 of the second cell frames 410, etc. Furthermore, the thicknesses of each of the cell frames 308 (e.g., T1, T2, T3, etc.) may be different, from each other.

Figure 9:
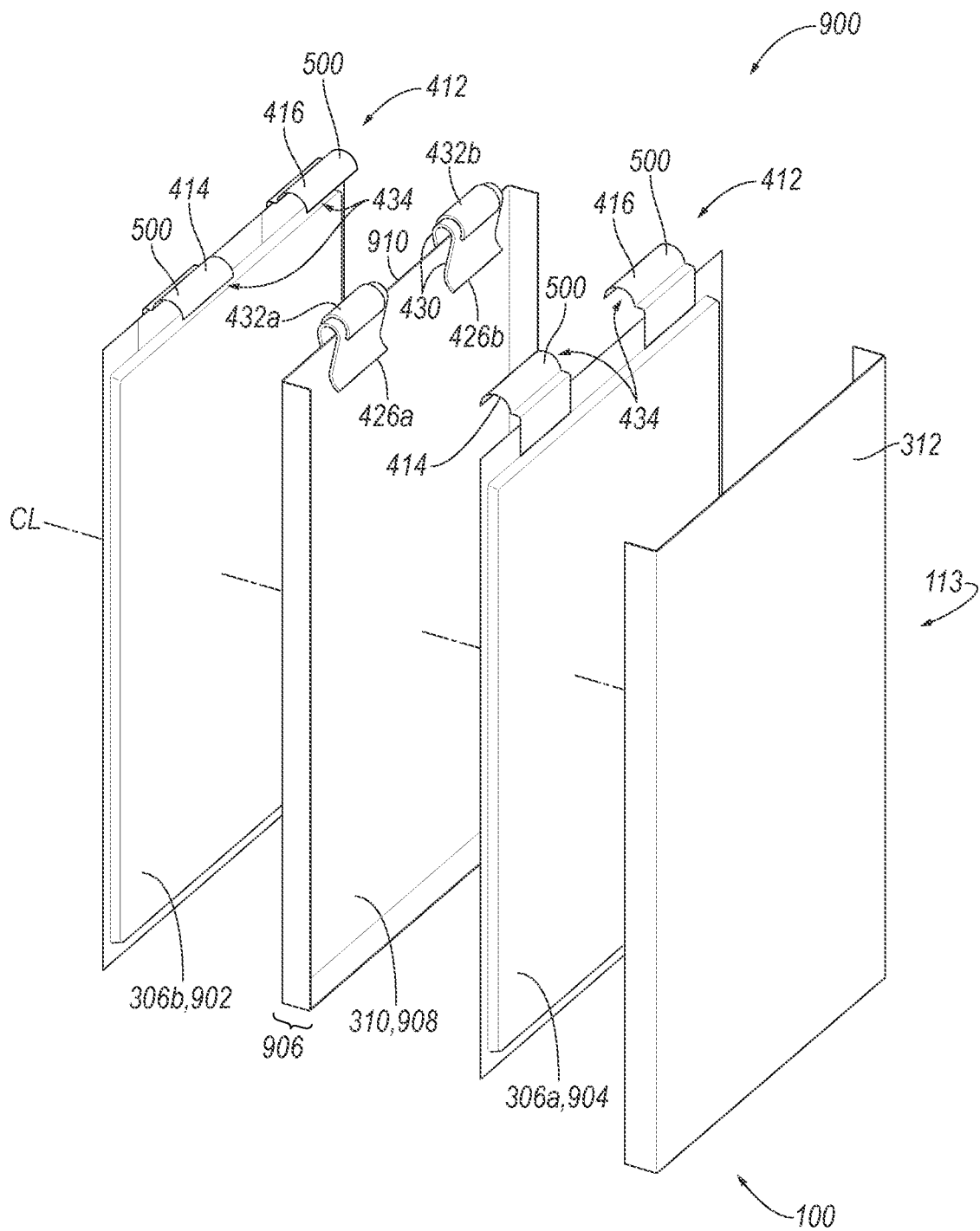
FIG. 9 is an exploded view of a battery cell assembly positioned in the battery pack at a termination end.

FIG. 9 illustrates an exploded view of a battery cell assembly 900 positioned in the battery pack 100 at the termination end 113, and the terminating cell frame 312. The battery pack 100 may include one or more battery cell assemblies 900. The battery cell assembly 900 includes a first battery cell 902, a second battery cell 904, and a support structure 906 having a first cell frame 908 (e.g., the abbreviated cell frame 310) disposed between the first and second battery cells 902, 904. In one arrangement, the electrical tabs 412 of the first and second battery cells 902, 904 are prebent, and the electrical tabs 412 of the second battery cell 904 are extending in a direction opposite to the electrical tabs 412 of the first battery cell 902.

With reference to FIGS. 3 and 9, the support structure 906 is positioned on the first sides 434 of the electrical tabs 412 of the first battery cell 902, e.g., the battery cell 306$b$. The second sides 500 of the electrical tabs 412 of the first battery cell 902 are positioned on the first sides 434 of the electrical tabs 412 of the second battery cell 904. Moreover, the support structure 906 contacts the first sides 434 of the electrical tabs 412 of the first battery cell 902 while the busbar 202 contacts the second sides 500 of the electrical tabs 412 of the second battery cell 904, e.g., the battery cell 306$a$.

In a similar manner described above for the battery cell assembly 400, the first cell frame 908 of the battery cell assembly 900 includes a first end 910. The first cell frame 908 further includes the clip 426, e.g., 426$a$ and 426$b$, as shown in FIG. 9, operatively connected to the first end 910. Additionally, the first cell frame 908 includes the tab backers 432, e.g., 432$a$ and 432$b$, as shown in FIG. 9. In one arrangement, the tab backers 432 are spaced apart from each other and disposed on the clip 426 such that the tab backers 432 are between the clips 426 and the first sides 434 of the electrical tabs 412 of the first battery cell 902.

Alternatively, the support structure 906 may be positioned on and in contact with the first sides 434 of the electrical tabs 412 of the second battery cell 904 while the busbar 202 contacts the second sides 500 of the electrical tabs 412 of the first battery cell 902, e.g., the battery cell 306$b$.

Referring to FIGS. 3 and 9, and as set forth above, the battery pack 100 includes the terminating cell frame 312. For example, the terminating cell frame 312, the first cell frame 908 (e.g., the abbreviated cell frame 310), and the cell frame 308a are configured to be nested together to hold and apply a predetermined pressure on the first and second battery cells 902, 904.

Figure 10:
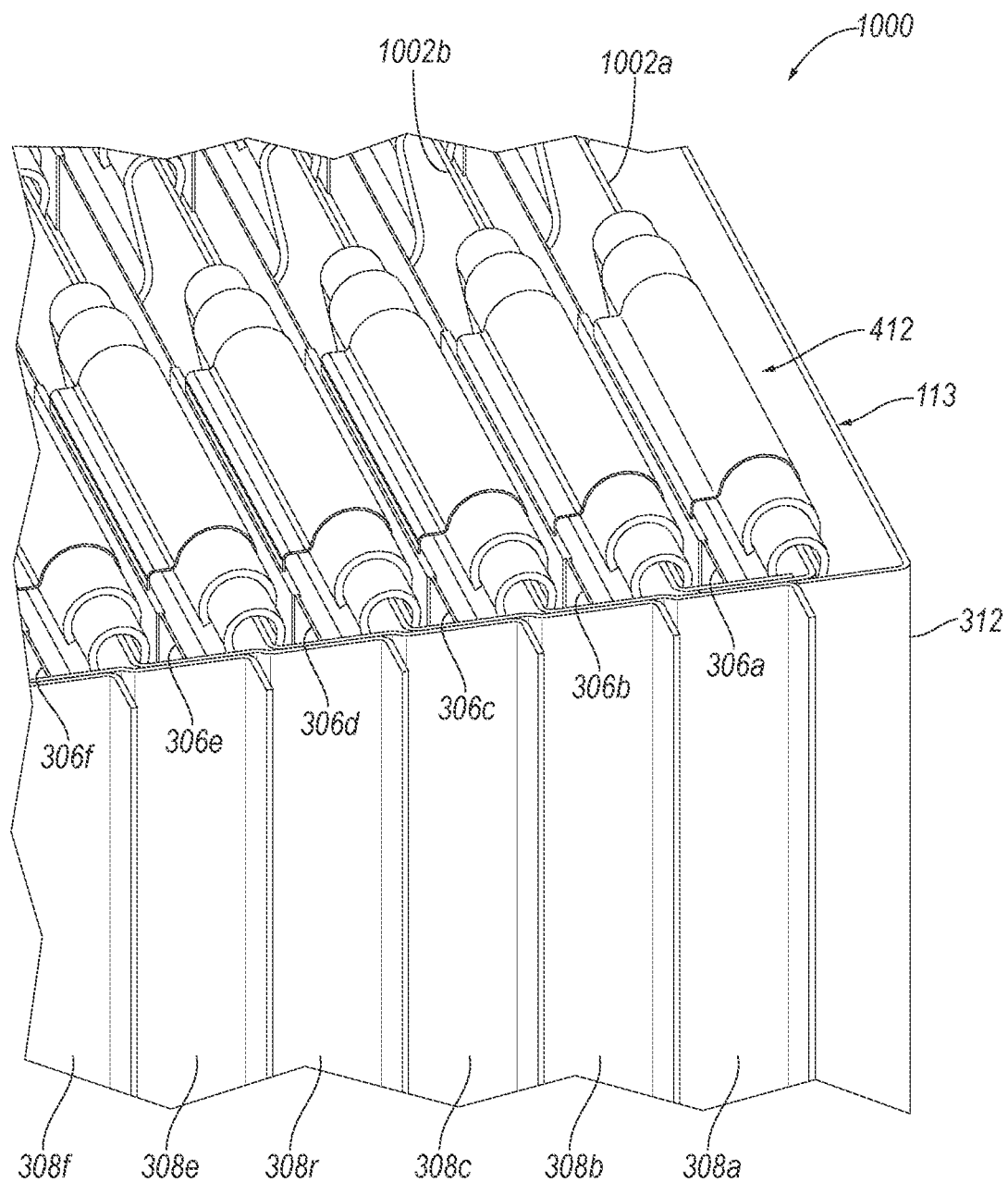
FIG. 10 is a perspective view of a second example battery pack.

Referring to FIG. 10, an example of a battery pack 1000 is illustrated. The battery pack 1000 includes the one or more battery cells 306, the one or more cell frames 308, and the terminating cell frame 312, as set forth above and illustrated in FIG. 3. The battery pack 1000 also includes the termination end 112 (not shown) and the termination end 113. The battery pack 1000 is slightly different from the battery pack 100. The battery pack 1000 includes two abbreviated cell frames 1002, e.g., 1002a and 1002b, and all the electrical tabs 412 of the battery cells 306 are extending in the same direction, as shown in FIG. 10. The abbreviated cell frames 1002 are the same as the abbreviated cell frame 310, but the abbreviated cell frames 1002 are configured to nest together with each other, the one or more cells frames 308, and the terminating cell frame 312 to apply a predetermined pressure on the battery cells 306. Furthermore, to accommodate the electrical tabs 412 extending in the same direction, the length L between the termination ends 112, 113 of the battery pack 1000 is greater than the length L between the termination ends 112, 113 of the battery pack 100 for a given number of the battery cells 306.

The battery pack 1000 includes the busbar 202. Another difference between the battery pack 1000 and the battery pack 100 is the configuration of the busbar 202. For example, when comparing the battery packs 100, 1000 for a given number of battery cells 306, the subcomponents of the busbar 202 may be different. For the case of twelve battery cells, e.g., 306a-306l, as shown in FIG. 3, the busbar 202a and the busbar 202b of the battery pack 100 are replaced with the busbar 202c and the busbar 202d, respectively, to accommodate the electrical tabs 412 of the battery cell 306a of the battery pack 1000. In other words, the electrical tabs 412 of the battery cell 306a of the battery pack 1000 are extending in the same direction as the battery cells 306b-306l; thus, an additional contour is needed on the busbar 202 at the termination end 113.

Figure 11:
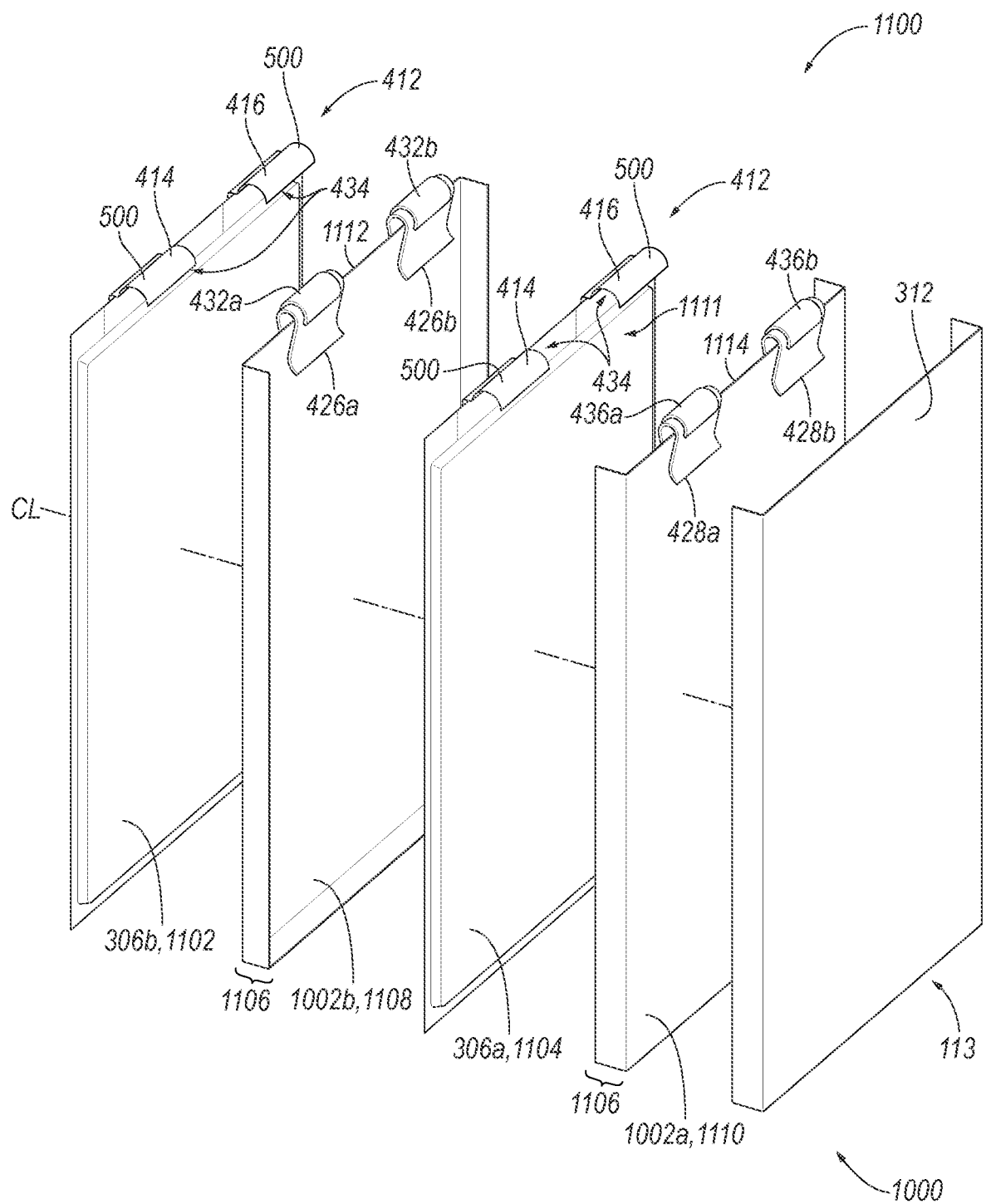
FIG. 11 is an exploded view of a battery cell assembly positioned in a battery pack at a termination end.

FIG. 11 illustrates a battery cell assembly 1100 positioned in the battery pack 1000 at the termination end 113, and the terminating cell frame 312. The battery pack 1000 may include one or more battery cell assemblies 1100. The battery cell assembly 1100, in one embodiment, includes a first battery cell 1102, a second battery cell 1104, and a support structure 1106 having a first cell frame 1108 and a second cell frame 1110. In one arrangement, the first cell frame 1108 is disposed between the first and second battery cells 1102, 1104, and the second cell frame 1110 is disposed along a side 1111 of the second battery cell 1104 facing away from the first battery cell 1102.

In a similar manner described above for the battery cell assembly 400, the first cell frame 1108 includes a first end 1112, and the second cell frame 1110 includes a second end 1114. The first cell frame 908 further includes the clip 426, e.g., 426a and 426b operatively connected to the first end 1112, and the second cell frame further includes the clip 428, e.g., 428a and 428b, operatively connected to the second end 1114, as shown in FIG. 11. Additionally, the first cell frame 908 includes the tab backers 432, e.g., 432a and 432b, and the second cell frame 1110 includes the tab backers 436, e.g., 436a and 436b, as shown in FIG. 11.

In one arrangement, the tab backers 432 are spaced apart from each other and disposed on the clip 426 such that the tab backers 432 are between the clip 426 and the first sides 434 of the electrical tabs 412 of the first battery cell 902. Furthermore, the tab backers 436 are spaced apart from each other and disposed on the clip 428 such that the tab backers 436 are between the clip 428 and the first sides 434 of the electrical tabs 412 of the second battery cell 1104. Moreover, the support structure 1106 contacts the first sides 434 of the electrical tabs 412 of the first and second battery cells 1102, 1104 while the busbar 202 contacts the second sides 500 of the electrical tabs 412 of the first and second battery cells 1102, 1104.

Figure 12:
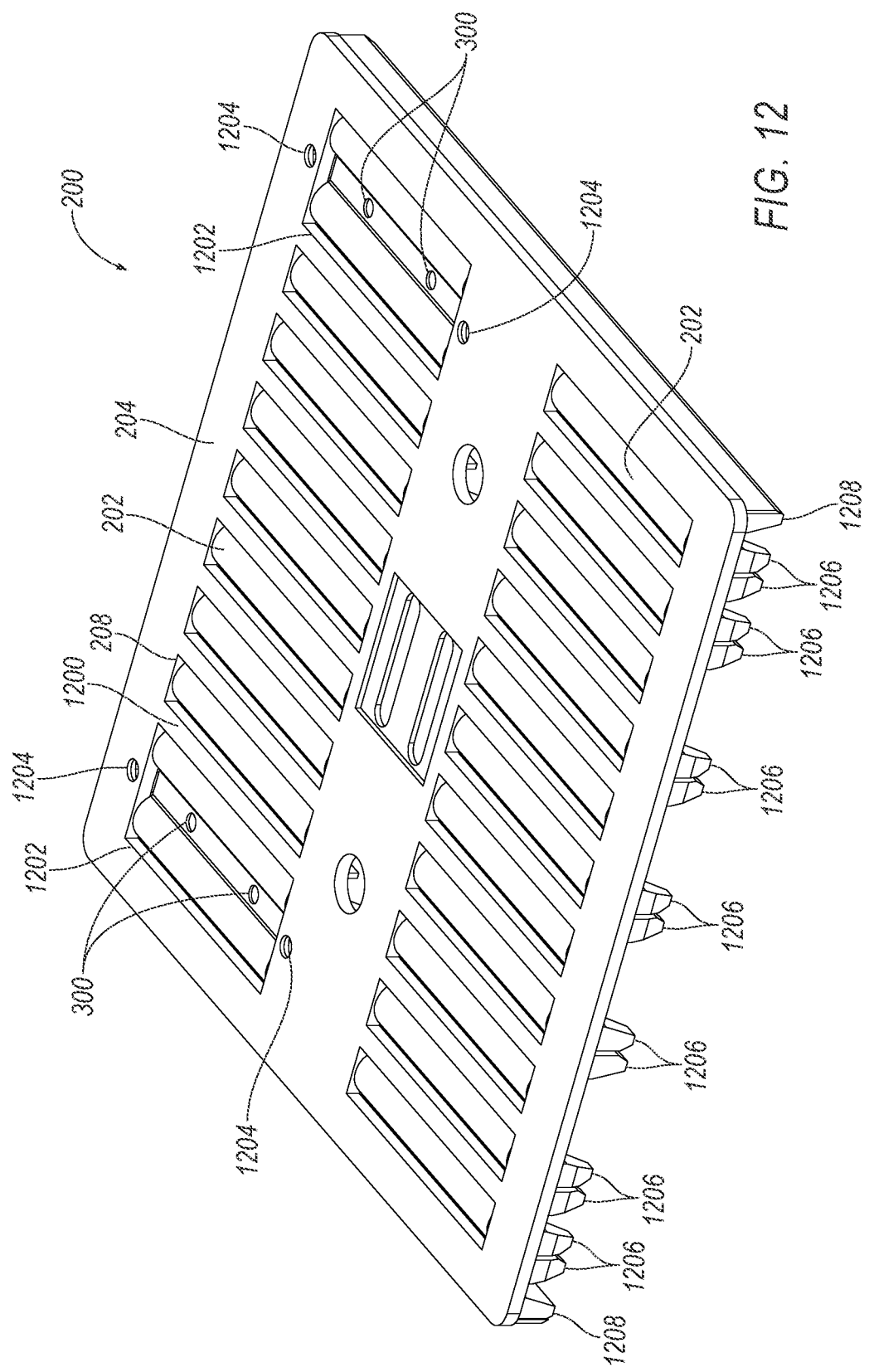
FIG. 12 is a top perspective view of a frame member.
Figure 13:
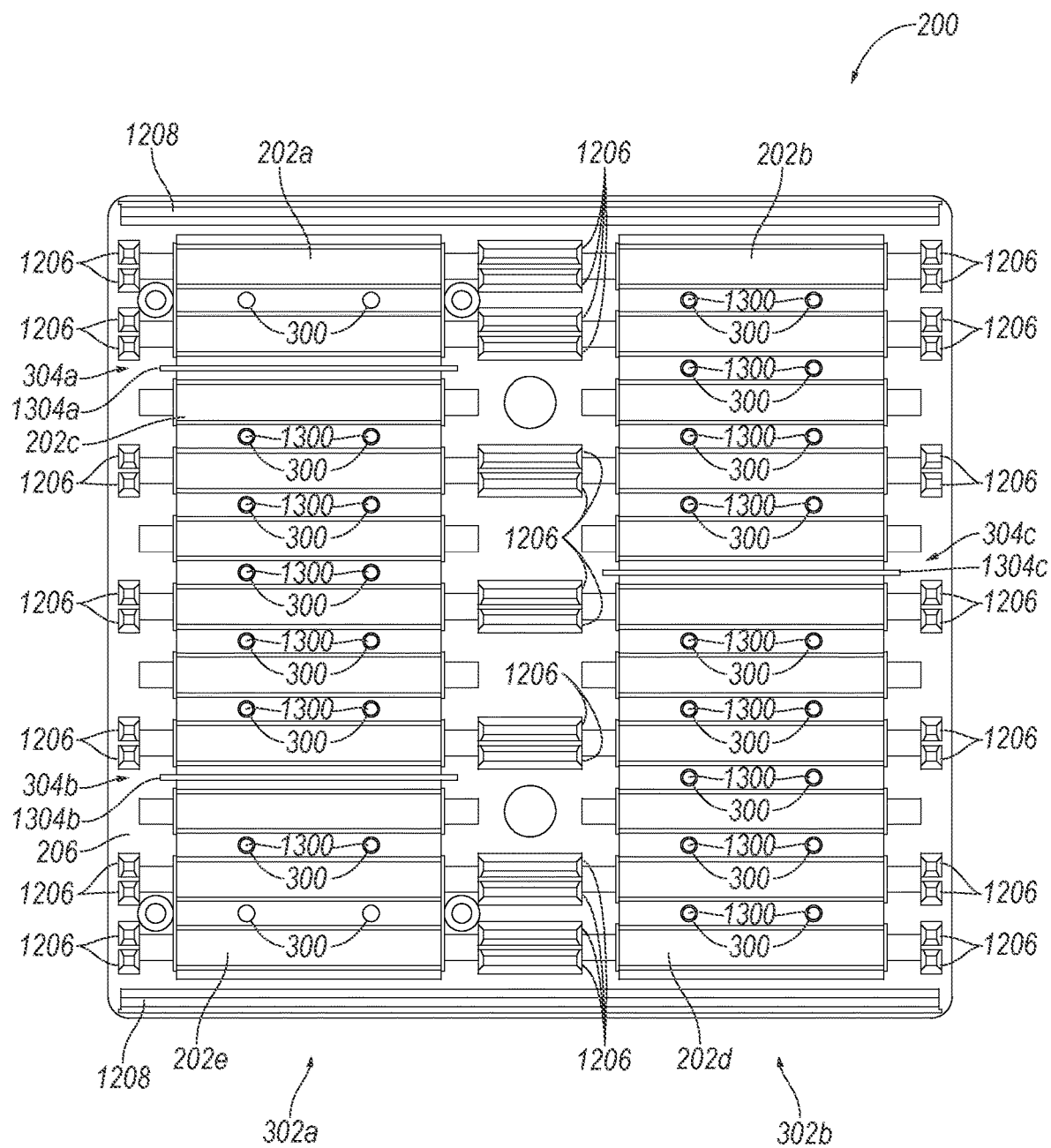
FIG. 13 is a bottom view of the frame member.

FIGS. 12-13 illustrate the frame member 200 of the battery pack 100 introduced in FIG. 2, fully showing the top surface 204 (FIG. 12) and the bottom surface 206 (FIG. 13). As set forth above, the frame member 200 is operatively connected to the busbar 202 such that the busbar 202 is carried by the frame member 200, and accommodates the one or more battery cells 306. In one embodiment, the frame member 200 aligns the busbar 202 with the electrical tabs 412 of the first and second battery cells 402, 404, 902, 904, 1102, 1104 that are prebent such that the busbar 202, the electrical tabs 412, the tab backers 432, 436, and the clips 426, 428 are sequentially in contact with each other. Stated another way, the frame member 200, which carries the busbar 202, aligns the busbar 202 such that when the frame member 200 is joined with the remaining components of the battery pack 100, the busbar 202 is in contact with the electrical tabs 412. That is, the busbar 202 is in contact with the second sides 500 of the electrical tabs 412 along the tab width TW.

The frame member 200 includes a plurality of ribs 1200 between the openings 208, as shown in FIG. 12. The ribs 1200 include mounting features 1300 on the bottom surface 206 of the frame member 200, as shown in FIG. 13. For example, the mounting features 1300 may be posts, standoffs, etc., for connecting the busbar 202 to the frame member 200. More specifically, the mounting features 300 of the busbar 202, as set forth above, may receive the mounting features 1300 of the ribs 1200 for connecting the busbar 202 to the frame member 200.

In one arrangement, the frame member 200 includes oversized openings 1202. The oversized openings 1202 extend through the frame member 200 from the top surface 204 to the bottom surface 206 and has a larger surface area on the top and bottom surfaces 204, 206 than the opening 208. The oversized openings 1202 accommodate attaching the positive and negative terminals 102, 104 to the busbar 202. The positive and negative terminals 102, 104, for example, may be electrically connected to the busbar 202 using the fasteners 210 (FIG. 2) via the mounting features 300 of the busbar 202. For example, the oversized openings 1202 are located at the termination ends 112, 113 of the battery pack 100, as shown in FIG. 12. Alternatively, the oversized openings 1202 may be located at the termination end 112, the termination end 113, and/or a location between the termination ends 112, 113.

Furthermore, in one embodiment, the frame member 200 includes pilot holes 1204. The pilot holes 1204 provide mounting locations to mount the positive and negative terminals 102, 104 to the frame member 200. For example, the positive and negative terminals 102, 104 may include posts, standoffs, threaded inserts, etc. (not shown) that align with the pilot holes 1204 when the positive and negative terminals 102, 104 are mounted to the frame member 200. The positive and negative terminals 102, 104 may be secured to the bottom surface 206 of the frame member by, e.g., bolts, screws, rivets, etc.

In one embodiment, the frame member 200 and the busbar 202 form a subassembly that is coupled to the cell frames 308, the abbreviated cell frames 310, 908, 1002, and the terminating cell frame 312 during the manufacturing of the battery pack 100, 1000. The frame member 200 includes a plurality of interior fasteners 1206 and one or more exterior fasteners 1208, as shown in FIGS. 12 and 13. The interior and exterior fasteners 1206, 1208 of the frame member 200 may provide structural support to the battery packs 100, 1000.

The interior fasteners 1206 are configured to clip onto the first ends 422, 910, 1112, of the first cell frames 408, 908, 1108, and the second ends 424, 1114 of the second cell frames 410, 1110, respectively, of the battery packs 100, 1000. For example, the interior fasteners 1206 may clip onto the first ends 422, 910, 1112 or the second ends 424, 1114 at one or more locations near the non-termination ends 114, 115 of the battery packs 100, 1000, as shown in FIGS. 12-13. In one arrangement, the interior fasteners 1206 may clip onto the first ends 422, 910, 1112 or the second ends 424, 1114 between the one or more rows 302 of the busbar 202, e.g., between rows 302a and 302b, as shown in FIG. 13. The interior fasteners 1206 may include lead-ins to facilitate assembling the frame member 200 onto the first ends 422, 910, 1112 and/or the second ends 424, 1114. The interior fasteners 1206 may couple onto the first ends 422, 910, 1112 and/or the second ends 424, 1114 at any suitable location within the battery pack 100, 1000.

The exterior fasteners 1208 are configured to extend into the battery packs 100, 1000 when the frame member 200 is coupled to the battery packs 100, 1000. In one arrangement, for the battery pack 100, the exterior fasteners 1208 extend between the cell frame 308 and the battery cell 306 positioned at the termination end 112, and the terminating cell frame 312 and the battery cell 306 positioned at the termination end 113. For example, the exterior fasteners 1208 of the battery pack 100 extend between the cell frame 308k and the battery cell 306l, and the terminating cell frame 312 and the battery cell 306a, in another arrangement, for the battery pack 1000, the exterior fasteners 1208 extend between the cell frame 308 and the battery cell 306 positioned at the termination end 112, and the terminating cell frame 312 and the abbreviated cell frame 1002 positioned at the termination end 113. For example, the exterior fasteners 1208 of the battery packs 1000 extend between the cell frame 308k and the battery cell 306l, and the terminating cell frame 312 and the abbreviated cell frame 1002a.

As set forth above, the connection area between the busbar 202 and the electrical tabs 412, which is contoured, is established when the frame member 200 is attached to the battery pack 100, 1000. Portions of the busbar 202 that are contoured substantially complementary to the electrical tabs 412 are received by the frame member 200 within the openings 208 between the ribs 1200 and within the oversized openings 1202. For example, the connection area between the busbar 202 and the electrical tabs 412 is accessible from the top end 106 and may be used for welding the busbar 202 to the electrical tabs 412 along the tab width TW within the openings 208 and oversized openings 1202.

The frame member 200 and associated interior and exterior fasteners align the busbar 202, which is carried by the frame member 200, on the second sides 500 of the electrical tabs such that the busbar 202 is in contact with the electrical tabs 412. Stated another way, during the battery pack manufacturing process, the frame member 200 and associated interior and exterior fasteners 1206, 1208 self-fixture the busbar 202 such that the busbar 202 is aligned and in contact with the electrical tabs 412. That is, the frame member 200 is a fixture that automatically aligns the busbar 202 and prepares the busbar 202 and the electrical tabs 412 for electrical coupling (e.g., welding) in the connection area.

As stated above, in one or more arrangements, the busbar 202 is electrically, connected to the electrical tabs 412 of the first battery cell 402, 902, 11.02 and the second battery cell 404, 904, 1104 and is configured to carry all or a portion of the battery current between the first battery cell 402, 902, 1102 and the second battery cell 404, 904, 1104. The busbar 202, namely subcomponents of the busbar 202, e.g., 202a-202e, as shown in FIG. 3 and FIG. 13, are configured, for example, to electrically connect the one or more battery cells 306 in parallel and/or series. For example, the busbars 202a-202e shown in FIG. 3 and FIG. 13 electrically connect the battery cells 306 of the battery pack 100 in a three-parallel ("3P")/four-series ("4S") configuration. Other parallel/series configurations are possible. For example, a 6P/2S configuration would require the busbar 202b and busbar 202d in each of the rows 302a, 302b of the busbar 202. As set forth above, the battery packs described herein are not limited in the number of the battery cells 306 or the number of the subcomponents that make up the bus bar 202. The busbar 202 (i.e., the subcomponents that make up the busbar 202) set up the desired parallel/series configuration.

The subcomponents of the busbar 202 are separated by the voids 304, as set forth above. The voids 304 electrically isolate the subcomponents of the busbar 202. For example, the voids 304, e.g., 304a-304c electrically isolate the busbar 202, e.g., 202a-202e, as shown in FIG. 3 and FIG. 1.3. The battery pack 100, 1000 may include one or more voids 304 based on the number of battery cells 306 and the desired parallel/series configuration. The voids 304 are created by partitions 1302 of the frame member 200. The partitions 1302 extend from the bottom surface 206 of the frame member 200 separating the subcomponents of the busbar 202. The frame member 200 may include one or more partitions 1304, e.g., 1304a-1304c, as shown in FIG. 13.

As set forth above, the electrical tabs 412 prebent and the busbar 202 is contoured substantially complementary to the electrical tabs 412. The tab backers and the clips are also contoured substantially complementary to the electrical tabs 412. In one arrangement, when bringing the busbar 202 via the frame member 200 in contact with the electrical tabs 412 during the battery pack assembly, bending of the electrical tabs 412 is unnecessary. In other words, a separate manufacturing process of bending the electrical tabs 412 is not needed, for the electrical tabs are prebent. The electrical tabs 412 are not fed through slots in the busbar 202 or slots in the tab backer because slots are not present in the busbar or tab backers.

Furthermore, since the electrical tabs 412 are prebent, when sandwiching the busbar 202, the electrical tabs 412, and the tab backer together, the electrical tabs 412 are not substantially deformed. The substantially complementary contours of the busbar 202 press down onto the electrical tabs 412 during the battery pack manufacturing process and the shape of the electrical tabs 412 is maintained, e.g., the shape of the semi-cylindrical portion 502 is maintained. For the case of the electrical tab 412 having the semi-cylindrical portion 502, substantially deforming the electrical tab 412 is defined as creating one or more linear (i.e., flat) sections on the semi-cylindrical portion 502 of the electrical tabs 412 that exceeds 10% of the circumference of the semi-circular portion 502, 11% of the circumference of the semi-circular portion 502, 12% of the circumference of the semi-circular portion 502, 9% of the circumference of the semi-circular portion 502, 8% of the circumference of the semi-circular portion 502, 7% of the circumference of the semi-circular portion 502, etc.

The configuration of the busbar 202 in FIG. 13 may require the positive and negative tabs 414, 416 to alternate. For example, and referring back to FIG. 3, the battery cells 306a-306c are in parallel and have their positive tabs 414 closest to the non-termination end 114. The battery cells 306d-306f are in parallel and their positive tabs 414 are closest to the non-termination end 115. The battery cells 306g-306i are in parallel and their positive tabs 414 are closest to the non-termination end 114. Finally, the battery cells 306j-306l are in parallel and their positive tabs 414 are closest to the non-termination end 115.

Figure 14:
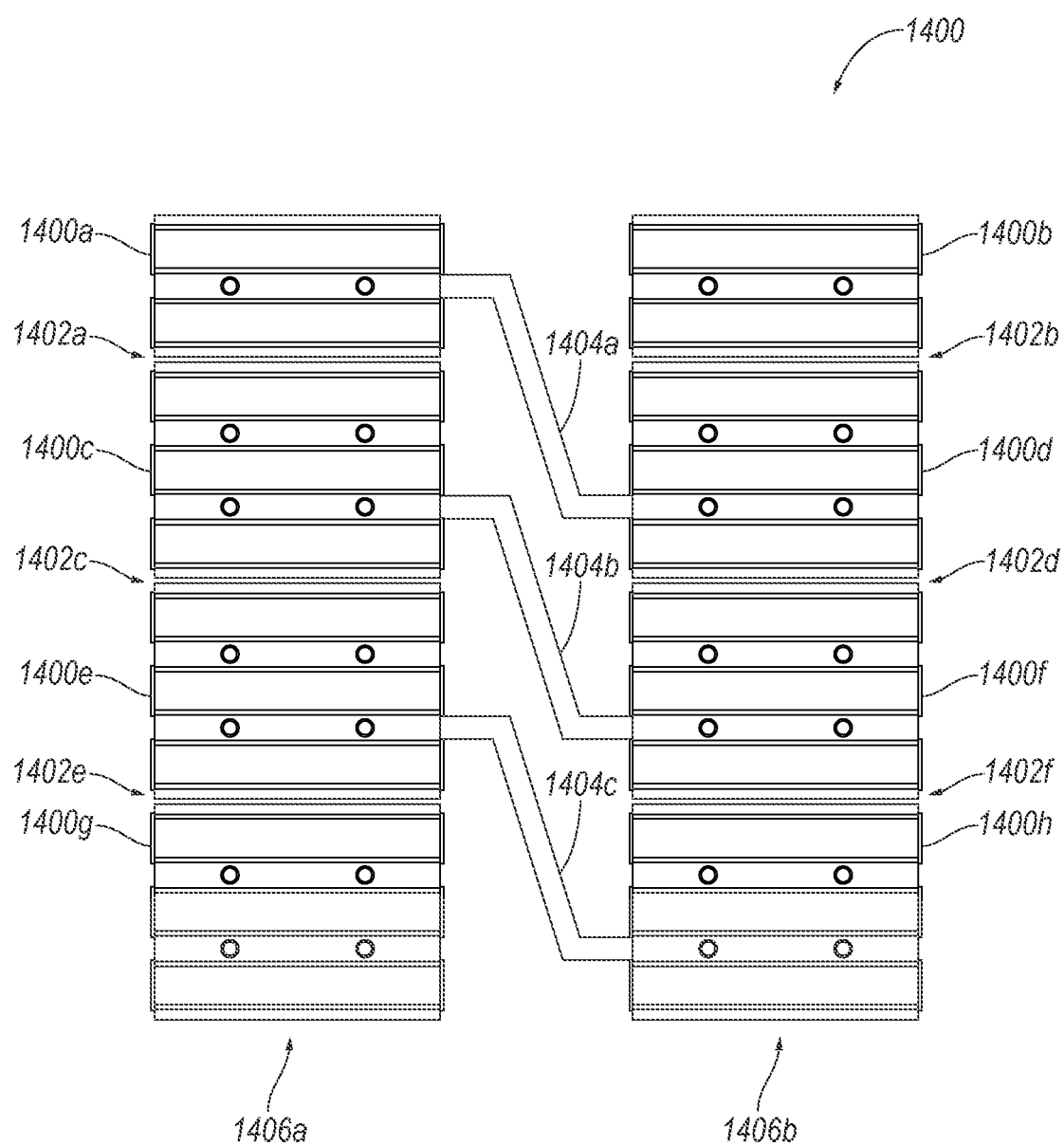
FIG. 14 is a top view of an alternative busbar.

Alternatively, as illustrated in FIG. 14, the battery pack 100 may include a busbar 1400. For example, the battery pack 100 may include eight busbars 1400, e.g., 1400a-1400b, separated by voids 1402, e.g., 1402a-1402f. The battery pack 100 may also include a breaker bar 1404. For example, the battery pack 100 may include three breaker bars 1404, e.g., 1404a-1404c. The busbar 1400 and the breaker bar 1404 allow the positive and negative tabs 414, 416 to remain in a specific row. For example, the busbar 1400 is arranged along two rows 1406, e.g., row 1406a and 1406b. The busbar 1400 and breaker bar 1404 allow the positive tabs 414 to remain in row 1406a or 1406b, while the negative tab 416 remains in 1406b or 1406a, respectively.

Figure 15:
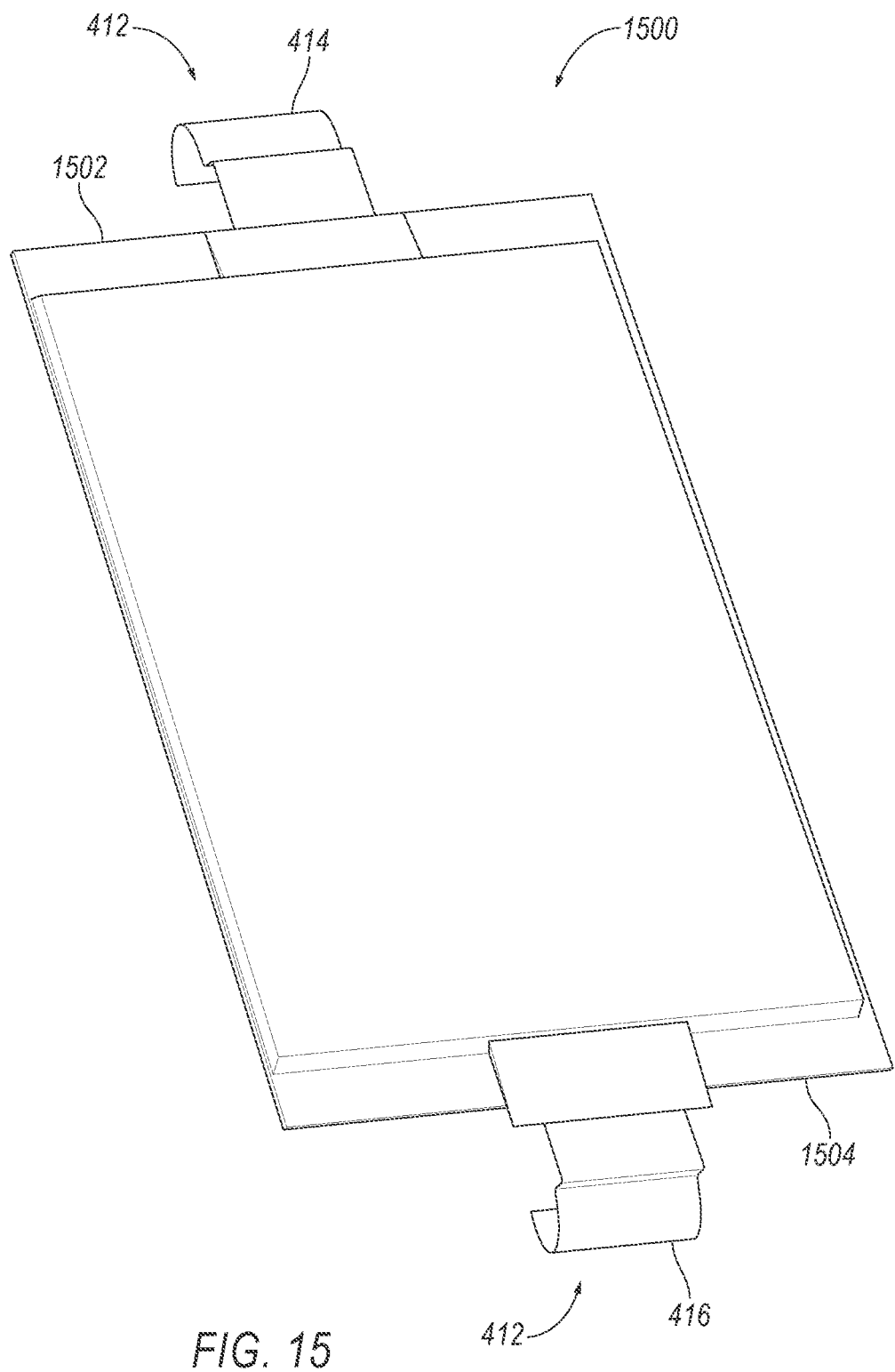
FIG. 15 is a perspective view of a battery cell having electrical tabs on opposite sides of the battery cell.

FIG. 15 illustrates a battery cell 1500 that includes the electrical tabs 412 on opposite sides of the battery cell 1500. In one arrangement, the electrical tabs 412 of the battery cell 1500 are prebent, as set forth above, and include the positive tab 414 and the negative tab 416. Further, the positive tab 414 extends from a first end 1502 of the battery cell 1500, and the negative tab 416 extends from a second end 1504 of the battery cell 1500. For example, the positive tab 414 extends from the first end 1502 in one direction, and the negative tab 416 extends from the second end 1504 in an opposite direction, as shown in FIG. 15.

Figure 16:
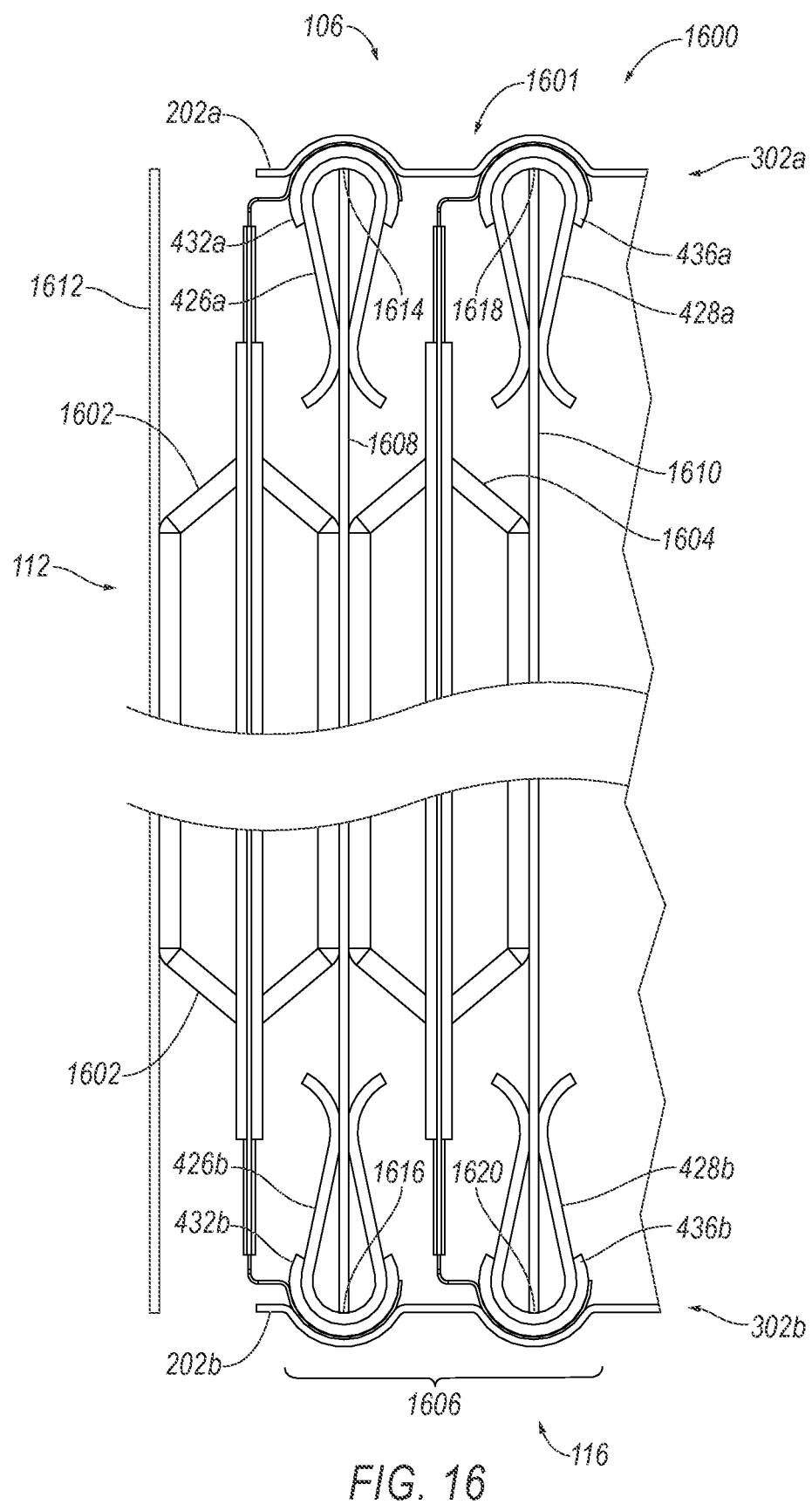
FIG. 16 is a side view of a battery cell assembly positioned in a third example battery pack at a termination end.

FIG. 16 illustrates a portion of an example of a battery pack 1600 having a battery cell assembly 1601 positioned in the battery pack 1600 at the termination end 112. FIG. 16 demonstrates the use of the battery cell 1500 with opposing tabs in the battery cell assembly 1601. The battery pack 1600 may include one or more battery cell assemblies 1601. Like the battery cell assembly 400, the battery cell assembly 1601, in one arrangement, includes a first battery cell 1602, a second battery cell 1604, and a support structure 1606 having a first cell frame 1608 and a second cell frame 1610. Moreover, the support structure 1606 contacts the first sides 434 of the electrical tabs 412 while the busbar 202 contacts the second sides 500 of the electrical tabs 412.

In one or more arrangements, the first cell frame 1608 includes a first end 1614 and a second end 1616. Additionally, the second cell frame 1610 includes a third end 1618 and a fourth end 1620. The first cell frame 1608 further includes the two clips 426, i.e., 426a and 426b, as shown in FIG. 16, spaced from each other and operatively connected to the first and second ends 1614, 1616. The second cell frame 1610 further includes the two clips 428, i.e., 428a and 428b, as shown in FIG. 16, spaced from each other and operatively connected to the third and fourth ends 1618, 1620.

In one arrangement, the first cell frame 1608 further includes the two tab backers 432, i.e., 432a and 432b, as shown in FIG. 16, spaced apart from each other. The tab backers 432a, 432b are disposed on the clips 426a, 426b of the first cell frame 1608, respectively, such that the two tab backers 432a, 432b are between the clips 426a, 426b and the first sides 434 of the electrical tabs 412 of the first battery cell 1602. The second cell frame 1610 further includes the two tab backers 436, i.e., 436a and 436b, as shown in FIG. 16, spaced apart from each other. The tab backers 436a, 436b are disposed on the clips 428a, 428b of the second cell frame 1610, respectively, such that the two tab backers 436a, 436b are between the clips 428a, 428b and the first sides 434 of the electrical tabs 412 of the second battery cell 1604.

The battery pack 1600, in one embodiment, includes the busbar 202. To accommodate the opposing tabs of the battery cell 1500, the battery pack 1600 includes two busbars 202, e.g., 202a and 202b on the top and bottom ends 106, 116, as shown in FIG. 16. Similar to the battery pack 100, the busbar 202 is arranged along the one or more rows 302. For example, the battery pack 1600 includes two rows 302, e.g., 302a and 302b, where the row 302a is arranged along the top end 106 and the row 302b is arranged along the bottom end 116, as shown in FIG. 16. The battery pack 1600 includes two frame members 200 (not shown), that carry the busbar 202a and the busbar 202b. The battery pack 1600 further includes a cell frame 1612. The cell frame 1612 differs from the cell frame 308k of the battery pack 100 in that the cell frame 1612 is configured to attach to the two frame members 200.

Now that the various potential systems, devices, elements and/or components have been presented, two examples of methods of manufacturing a battery cell assembly will now be described.

Figure 17:
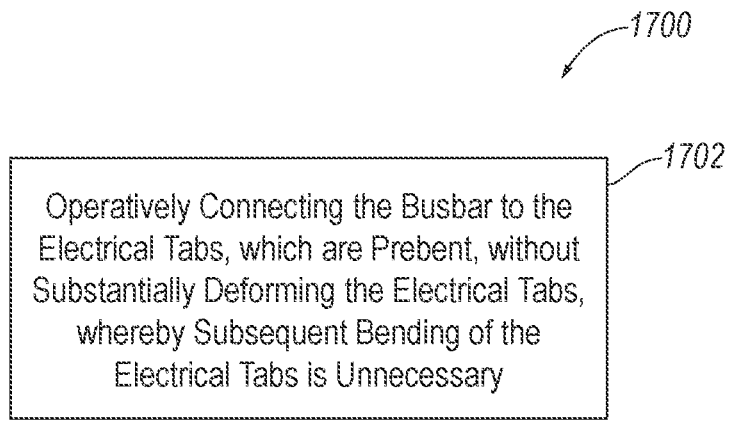
FIG. 17 is a flowchart illustrating one embodiment of a method of manufacturing a battery cell assembly for a battery pack.
Figure 18:
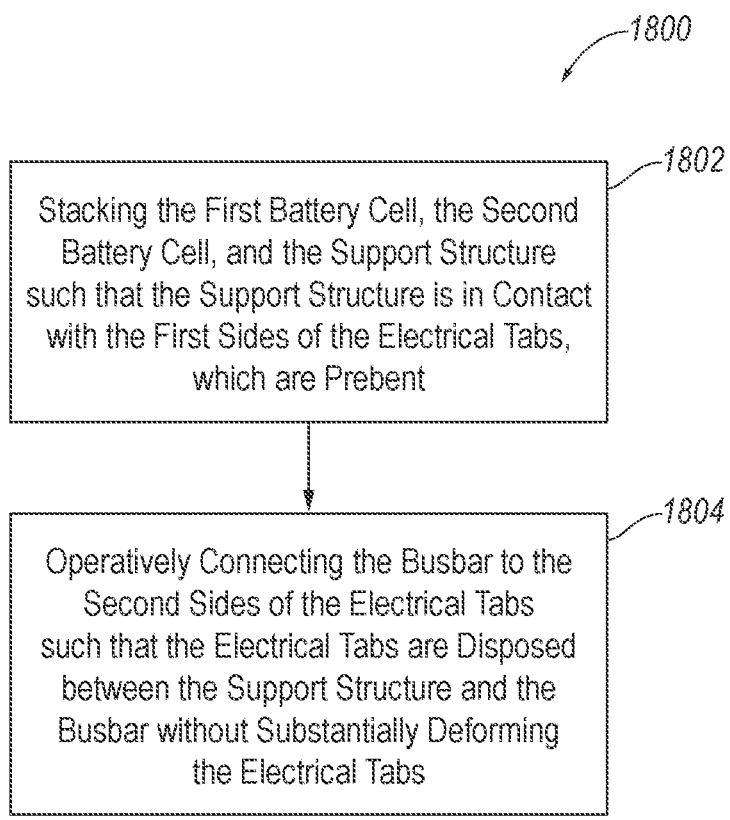
FIG. 18 is a flowchart illustrating another embodiment of a method of manufacturing a battery cell assembly for a battery pack.

Referring to FIGS. 17 and 18, an example of a method 1700 and a method 1800 of manufacturing a battery cell assembly for a battery pack are shown. Various possible steps of methods 1700, 1800 will now be described. The methods 1700, 1800 illustrated in FIGS. 17 and 18 will be discussed from the perspective of the battery pack 100 and the battery cell assembly 400 of FIGS. 1-9, and 12-13. It should be appreciated that the methods 1700, 1800 are not limited to the illustrated methods of manufacturing the battery cell assembly 400 of the battery pack 100, but are instead examples and may be applicable to the embodiments described above in relation to FIGS. 1-16. It is also understood that the methods 1700, 1800 can be carried out with other suitable systems and arrangements.

With reference to FIG. 17, at block 1702, the busbar 202 is joined with a plurality of the battery cells 306 by operatively connecting the busbar 202 to the electrical tabs 412, which are prebent, without substantially deforming the electrical tabs 412, whereby subsequent bending of the electrical tabs 412 is unnecessary. The busbar 202 is contoured substantially complementary to the electrical tabs 412 (i.e., the complex shape of the electrical tabs 412), which is established when the electrical tabs 412 are prebent. The frame member 200, which carries the busbar 202, acts as a fixture that automatically aligns the busbar 202 with the electrical tabs 412 so that the busbar 202 is in contact with the electrical tabs 412 (e.g., along the tab width TW) when attaching the frame member 200 to the battery pack 100, i.e., components of the battery pack 100. A plurality of the support structures 406 each having the tab backers 432, 436 are joined with the busbar 202 and the electrical tabs 412 by positioning the plurality of the support structure 406 such that the electrical tabs 412 are between the busbar 202 and the tab backers 432, 436. In one arrangement, the busbar 202 and the electrical tabs 412 are joined by welding the busbar 202 and the electrical tabs 412 together.

Because the busbar 202 and the tab backers 432, 436 are contoured substantially complementary to the electrical tabs 412, as set forth above, the sandwich that is formed from the busbar 202, the tab backers 432, 436, and the electrical tabs 412 when brought together does not substantially deform the electrical tabs 412. Furthermore, subsequent bending of the electrical tabs 412 that are prebent is not needed during the manufacturing of the battery cell assembly 400 for the battery pack 100.

Referring to FIG. 18, at block 1802, manufacturing the battery cell assembly 400 begins by stacking the first battery cell 402, the second battery cell 404, and the support structure 406 such that the support structure 406 is in contact with the first sides 434 of the electrical tabs 412, which are prebent. More specifically, the first cell frame 408 of the support structure 406 and the first battery cell 402 are joined together by stacking the first cell frame 408 adjacent to the first battery cell 402. Furthermore, the second battery cell 404 and the first cell frame 408 are joined together by stacking the second battery cell 404 adjacent to the first cell frame 408. And further yet, the second cell frame 410 of the support structure 406 and the second battery cell 404 are joined together by stacking the second cell frame 410 adjacent to the second battery cell 404. As set forth above, the support structure 406 includes the tab backers 432, 436, and the resulting configuration allows the support structure 406 to contact the first sides 434 of the electrical tabs 412.

At the block 1804, the busbar 202 is joined with the first and second battery cells 402, 404 by operatively connecting the busbar 202 to the second sides 500 of the electrical tabs 412, such that the electrical tabs 412 are disposed between the support structure 406 and the busbar 202 without substantially deforming the electrical tabs 412. The frame member 200, which carries the busbar 202, acts as a fixture when attaching the frame member 200 to the battery pack 100, i.e., the components of the battery pack 100, so as to cause the busbar 202 to be aligned and in contact with the second sides 500 of the electrical tabs 412, e.g., along the tab width TW.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While recited characteristics and conditions of the invention have been described in connection with certain embodiments, it is to be understood that the invention is not to be limited to the disclosed embodiments. Rather, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A battery cell assembly, comprising:
a first battery cell including two electrical tabs extending from the first battery cell;
a second battery cell positioned substantially adjacent to the first battery cell and including two electrical tabs extending from the second battery cell, wherein the electrical tabs of the first and second battery cells are prebent;
a busbar operatively connected to the electrical tabs of the first battery cell and to the electrical tabs of the second battery cell; and
a support structure positioned on first sides of the electrical tabs of the first and second battery cells such that the electrical tabs of the first and second battery cells are disposed between the support structure and the busbar;
wherein:
the electrical tabs of the first and second battery cells include second sides opposite the first sides, and the support structure contacts the first sides while the busbar contacts the second sides;
the support structure includes a first cell frame and a second cell frame, the first cell frame is disposed between the first and second battery cells, and the second cell frame is disposed along a side of the second battery cell facing away from the first battery cell;
the first cell frame includes a first end and the second cell frame includes a second end, the first cell frame further includes a clip operatively connected to the first end and the second cell frame further includes a clip operatively connected to the second end;
the first cell frame further includes two tab backers that are spaced apart from each other and disposed on the clip of the first cell frame such that the two tab backers of the first cell frame are between the clip of the first cell frame and the first sides of the electrical tabs of the first battery cell, and
the second cell frame further includes two tab backers that are spaced apart from each other and disposed on the clip of the second cell frame such that the two tab backers of the second cell frame are between the clip of the second cell frame and the first sides of the electrical tabs of the second battery cell.

2. The battery cell assembly of claim 1, wherein the busbar is electrically connected to the electrical tabs of the first and second battery cells and is configured to carry all or a portion of a battery current between the first and second battery cells; and
wherein the busbar and the electrical tabs of the first and second battery cells are welded together.

3. The battery cell assembly of claim 1, further comprising:
a frame member operatively connected to the busbar such that the busbar is carried by the frame member,
wherein the frame member aligns the busbar with the electrical tabs of the first and second battery cells such that the busbar, the electrical tabs, the tab backers, and the clips are sequentially in contact with each other.

4. The battery cell assembly of claim 3, wherein the clips electrically isolate the tab backers from the first and second cell frames.

5. A battery cell assembly, comprising:
a first battery cell including two electrical tabs extending from the first battery cell;
a second battery cell positioned substantially adjacent to the first battery cell and including two electrical tabs extending from the second battery cell, wherein the electrical tabs of the first and second battery cells are prebent;
a busbar operatively connected to the electrical tabs of the first battery cell and to the electrical tabs of the second battery cell; and a support structure positioned on first sides of the electrical tabs of the first and second battery cells such that the electrical tabs of the first and second battery cells are disposed between the support structure and the busbar;

wherein:

the electrical tabs of the first and second battery cells include second sides opposite the first sides, and the support structure contacts the first sides while the busbar contacts the second sides;

the support structure includes a first cell frame and a second cell frame, the first cell frame is disposed between the first and second battery cells, and the second cell frame is disposed along a side of the second battery cell facing away from the first battery cell;

the first cell frame includes a first end and a second end and the second cell frame includes a third end and a fourth end, the first cell frame further includes two clips spaced from each other and operatively connected to the first and second ends and the second cell frame further includes two clips spaced from each other and operatively connected to the third and fourth ends; and the first cell frame further includes two tab backers that are spaced apart from each other and disposed on the clips of the first cell frame such that the two tab backers of the first cell frame are between the clips of the first cell frame and the first sides of the electrical tabs of the first battery cell, and the second cell frame further includes two tab backers that are spaced apart from each other and disposed on the clips of the second cell frame such that the two tab backers of the second cell frame are between the clips of the second cell frame and the first sides of the electrical tabs of the second battery cell.

* * * * *